United States Patent
Kapoor et al.

(10) Patent No.: US 11,263,545 B2
(45) Date of Patent: Mar. 1, 2022

(54) CONTROL OF CYBER-PHYSICAL SYSTEMS UNDER UNCERTAINTY

(71) Applicant: Microsoft Technology Licensing, LLC, Redmond, WA (US)

(72) Inventors: Ashish Kapoor, Kirkland, WA (US); Dorsa Sadigh, Walnut Creek, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 1503 days.

(21) Appl. No.: 15/199,797

(22) Filed: Jun. 30, 2016

(65) Prior Publication Data
US 2018/0005118 A1    Jan. 4, 2018

(51) Int. Cl.
*G06N 5/02*    (2006.01)
*G06N 7/00*    (2006.01)
*G06N 20/00*    (2019.01)

(52) U.S. Cl.
CPC ............. *G06N 7/005* (2013.01); *G06N 20/00* (2019.01)

(58) Field of Classification Search
CPC . G06N 3/00–20/20; G06N 1/00–24/04; G06N 5/00–048; G06N 7/00–26; G06N 20/00–20; G05B 13/00; G05B 13/0265–048
USPC ..................................... 700/1–306; 706/1–62
See application file for complete search history.

(56) References Cited

U.S. PATENT DOCUMENTS

| | | |
|---|---|---|
| 4,862,373 A | 8/1989 | Meng |
| 5,764,510 A | 6/1998 | Cameron et al. |
| 6,594,844 B2 | 7/2003 | Jones |
| 6,738,682 B1 * | 5/2004 | Pasadyn ........... G05B 19/41865 700/100 |
| 7,188,000 B2 | 3/2007 | Chiappetta et al. |
| 7,797,062 B2 * | 9/2010 | Discenzo ........... G05B 23/0294 700/28 |

(Continued)

FOREIGN PATENT DOCUMENTS

| | | |
|---|---|---|
| CN | 102520718 A | 6/2012 |
| WO | 2001078951 A1 | 10/2001 |

OTHER PUBLICATIONS

Duin et al. "Experiments with Classifier Combining Rules" (hereinafter Duin), 2000, MCS 2000: Multiple Classifier Systems.*

(Continued)

*Primary Examiner* — Jue Louie
(74) *Attorney, Agent, or Firm* — Calfee, Halter & Griswold LLP

(57) ABSTRACT

Various technologies described herein pertain to generating control inputs for a cyber-physical system. A prediction concerning a phenomenon can be generated, utilizing a classifier, based on sensor data acquired by a sensor. The prediction can include a probability distribution over a set of possible values of the phenomenon, where the phenomenon pertains to the cyber-physical system or an environment in which the cyber-physical system operates. Control inputs for the cyber-physical system that satisfy constraints that maintain safe operation of the cyber-physical system in the environment can be synthesized. The constraints can be based on the prediction that includes the probability distribution over the set of possible values of the phenomenon. Further, the cyber-physical system can be caused to operate in the environment based on the control inputs.

20 Claims, 10 Drawing Sheets

(56) References Cited

U.S. PATENT DOCUMENTS

| | | | |
|---|---|---|---|
| 8,290,617 | B2 | 10/2012 | Ruge |
| 8,788,092 | B2 | 7/2014 | Casey et al. |
| 2006/0229774 | A1 | 10/2006 | Park et al. |
| 2007/0288414 | A1* | 12/2007 | Barajas .................. G06N 20/00 706/46 |
| 2008/0208487 | A1* | 8/2008 | Goebel ................ G06N 3/0436 702/34 |
| 2011/0087627 | A1* | 4/2011 | Schmid ................ G06N 3/0454 706/21 |
| 2012/0316680 | A1 | 12/2012 | Olivier et al. |
| 2014/0035775 | A1* | 2/2014 | Zeng ..................... G01S 13/931 342/52 |
| 2014/0310228 | A1* | 10/2014 | Nakabayashi ......... G06N 7/005 706/52 |
| 2014/0336791 | A1* | 11/2014 | Asenjo ................... G06Q 10/06 700/44 |
| 2015/0106058 | A1* | 4/2015 | Mazzaro ............. G01M 99/005 702/181 |
| 2016/0246269 | A1* | 8/2016 | Ahmed .................... F24F 11/56 |
| 2016/0350671 | A1* | 12/2016 | Morris, II .......... G05B 23/0229 |
| 2017/0308802 | A1* | 10/2017 | Ramsoy ................ G06N 20/20 |

OTHER PUBLICATIONS

Hirade et al. "Ensemble Learning for Change-Point Prediction", 2012, 21st International Conference on Pattern Recognition.*
Zhao et al. "Posterior Probability Based Multi-classifier Fusion in Pedestrian Detection", 2014, Advances in Intelligent Systems and Computing.*
Yoo et al. "Control with Probabilistic Signal Temporal Logic", Oct. 2015, arXiv:1510.08474v1, retrieved from: https://arxiv.org/abs/1510.08474.*
Jha et al. "Automated Synthesis of Safe Autonomous Vehicle Control Under Perception Uncertainty", Jun. 4, 2016, NFM 2016: NASA Formal Methods.*
Gurobi Optimization, "Gurobi Optimizer Reference Manual", 2016, 592 pages.
Andrieu, et al., "An Introduction to MCMC for Machine Learning", In Machine Learning, vol. 50, No. 1-2, 2003, pp. 5-43.
Aswani, et al., "Provably Safe and Robust Learning-Based Model Predictive Control", In Automatica, vol. 49, No. 5, 2013, pp. 1216-1226.
Beal, Matthew J., "Variational Algorithms for Approximate Bayesian Inference", May 2003, 281 pages.
Ben-Tal, et al., "Robust Optimization", 2009, 456 pages.
Blackmore, et al., "Chance-Constrained Optimal Path Planning With Obstacles", In IEEE Transactions on Robotics, vol. 27, No. 6, Dec. 2011, pp. 1080-1094.
Boyd, et al., "Convex Optimization", Cambridge University Press, 2004, 730 pages.
Carvalho, et al., "Stochastic Predictive Control of Autonomous Vehicles in Certain Environments", In 12th International Symposium on Advanced Vehicle Control, 2014, 8 pages.
Donze, et al., "Efficient Robust Monitoring for STL", In Computer Aided Verification, 2013, 16 pages.
Donze, et al., "Robust Satisfaction of Temporal Logic Over Real-Valued Signals", 2010, 16 pages.
Fu, et al., "Integrating Active Sensing Into Reactive Synthesis With Temporal Logic Constraints Under Partial Observations", In arXiv:1410.0083, Oct. 2014, 7 pages.
Fu, et al., "Probably Approximately Correct MDP Learning and Control With Temporal Logic Constraints", In arXiv:1404.7073, Apr. 2014, 9 pages.
Fu, et al., "Computational Methods for Stochastic Control With Metric Interval Temporal Logic Specifications", In arXiv:1503.07193, Apr. 2015, 8 pages.
Wongpiromsarn, et al., "Receding Horizon Control for Temporal Logic Specifications", In 13th ACM International Conference on Hybrid Systems: Computation and Control, 2010, 10 pages.
Gillula, et al., "Guaranteed Safe Online Learning Via Reachability: Tracking a Ground Target Using a Quadrotor", In 2012 IEEE International Conference on Robotics and Automation, 2012, 8 pages.
Gol, et al., "Temporal Logic Model Predictive Control", In Automatica, vol. 56, 2015, pp. 78-85.
Wang, et al., "Robust Control of a Class of Uncertain Nonlinear Systems", In Systems & Control Letters, vol. 19, 1992, pp. 139-149.
Huang, et al., "Aerodynamics and Control of Autonomous Quadrotor Helicopters in Aggressive Maneuvering", In 2009 IEEE International Conference on Robotics and Automation, 2009, 7 pages.
Kothare, et al., "Robust Constrained Model Predictive Control Using Linear Matrix Inequalities", In Automatica, vol. 32, No. 10, Mar. 18, 1995, pp. 1361-1379.
Kress-Gazit, "Temporal-Logic-Based Reactive Mission and Motion Planning", In IEEE Transactions on Robotics, vol. 25, No. 6, Dec. 2009, pp. 1370-1381.
Lenz, et al., "Stochastic Model Predictive Controller With Chance Constraints For Comfortable and Safe Driving Behavior of Autonomous Vehicles, In IEEE Intelligent Vehicles Symposium", vol. 4, 2015, 6 pages.
Livingston, et al., "Backtracking Temporal Logic Synthesis for Uncertain Environments", In 2012 IEEE International Conference on Robotics and Automation, 2012, 8 pages.
Lofberg, Johan, "YALMIP: A Toolbox for Modeling and Optimization in MATLAB", In 2004 IEEE International Symposium on Computer Aided Control Systems Design, 2004, 6 pages.
Maler, et al., "Monitoring Temporal Properties of Continuous Signals", In Formal Techniques, Modelling and Analysis of Time and Fault-Tolerant Systems, 2004, 16 pages.
Minka, Thomas P., "A Family of Algorithms for Approximate Bayesian Inference", PhD Thesis, Massachusetts Institute of Technology, Jan. 2001, 75 pages.
Mitchell, et al., "Level Set Methods for Computation in Hybrid Systems", In Hybrid Systems: Computation and Control, 2000, 14 pages.
Mitchell, et al., "A Time-Dependent Hamilton-Jacobi Formulation of Reachable Sets for Continuous Dynamic Games", In IEEE Transactions on Automatic Control, vol. 50, No. 7, Jul. 2005, pp. 947-957.
Vitus, Michael P., "Stochastic Control Via Change Constrained Optimization and Its Application to Unmanned Aerial Vehicles", PhD Thesis, Stanford University, Mar. 2012, 178 pages.
Piterman, et al., "Synthesis of Reactive(1) Designs", In Verification, Model Checking, and Interpretation, 2006, pp. 364-380.
Puggelli, et al., "Polynomical-Time Verification of PCTL Properties of MDPs With Convex Uncertainties", In Computer Aided Verification, 2013, 16 pages.
Raman, et al., "Model Predictive Control With Signal Temporal Logic Specifications", In 2014 IEEE 53rd Annual Conference on Decision and Control, 2014, 7 pages.
Raman, et al., "Reactive Synthesis From Signal Temporal Logic Specifications", In 18th International Conference on Hybrid Systems: Computation and Control, 2015, 9 pages.
Sadigh, et al., "A Learning Based Approach to Control Synthesis Of Markov Decision Processes For Linear Temporal Logic Specifications", In 2014 IEEE 53rd Annual Conference on Decision and Control, 2014, 9 pages.
Svorenove, et al., "Temporal Logic Control for Stochastic Linear Systems Using Abstraction Refinement of Probabilistic Games", In 18th International Conference on Hybrid Systems: Computation and Control, 2015, 13 pages.
Vitus, et al., A Probabilistic Approach to Planning and Control in Autonomous Urban Driving, In 2013 IEEE 52nd Annual Conference on Decision and Control, 2013, 6 pages.
Zhou, et al., "Essentials of Robust Control", May 25, 1999, 425 pages.
Sermanet, et al., "Mapping and Planning Under Uncertainty in Mobile Robots with Long-Range Perception", In Proceedings of IEEE/RSJ International Conference on Intelligent Robots and Systems, Sep. 22, 2008, pp. 2525-2530.

(56) References Cited

OTHER PUBLICATIONS

Budiharto, et al., "Multiple Moving Obstacles Avoidance of Service Robot using Stereo Vision", In Journal of TELKOMNIKA (Telecommunication Computing Electronics and Control), vol. 9, No. 3, Dec. 2011, pp. 433-444.
Stentz, Anthony, "Optimal and Efficient Path Planning for Partially-Known Environments", In Proceedings of IEEE International Conference on Robotics and Automation, May 8, 1994, pp. 3310-3317.
Lacroix, et al., "Reactive Navigation in Outdoor Environments", In International Journal of Robotics Research, Special Issue on Field and Service Robotics, Retrieved on: Oct. 12, 2015, pp. 1-36.
Halatci, et al., "Terrain Classification and Classifier Fusion for Planetary Exploration Rovers", In Proceedings of IEEE Aerospace Conference, Mar. 3, 2007, pp. 1-11.
Lazkano, et al., "On the use of Bayesian Networks to develop behaviours for mobile robots", In Proceedings of Robotics and Autonomous Systems, vol. 55, Issue 3, Mar. 2007, 3 pages.
Kataoka, Shinji, "A Stochastic Programming Model", In Econometrica, vol. 31, No. 1-2, Jan. 1963, pp. 181-196.
Gelman, et al. "Bayesian Data Analysis", Third Edition, 2014, 656 pages.
Rasmussen, et al., "Gaussian Processes for Machine Learning", MIT Press, 2006, 266 pages.
Van De Panne, et al., "Minimum-Cost Cattle Feed Under Probabilistic Protein Constraints", In Management Science, vol. 9, No. 3, Apr. 1963, pp. 405-430.
Garcia, et al., "Model Predictive Control: Theory and Practice—A Survey", In Automatica, vol. 25, No. 3, 1989, pp. 335-348.
Akametalu, et al., "Reachability-Based Safe Learning With Gaussian Processes", In 53rd Conference on Decision and Control, Dec. 15, 2014, pp. 1424-1431.

\* cited by examiner

CONTROL OF CYBER-PHYSICAL SYSTEMS UNDER UNCERTAINTY

BACKGROUND

Control systems are commonly built and designed to manage, command, direct, and/or regulate behavior of other devices or systems. For instance, control systems are commonly used in industrial production for controlling equipment or machines in an industrial environment. More recently, control systems that monitor and/or control cyber-physical systems have become more prevalent.

A cyber-physical system can include physical entities controlled and/or monitored by computational elements. Examples of cyber-physical systems include smart grids, autonomous automotive systems, medical monitoring systems, process control systems, robotics, and automatic pilot avionics. However, uncertainty arising from various factors, such as an environment in which a cyber-physical system is located, can detrimentally impact a control strategy for the cyber-physical system. For instance, uncertainty due to behaviors of other vehicles within proximity of an autonomous automotive system can cause challenges when generating control inputs for the autonomous automotive system in order to avoid collisions.

SUMMARY

Described herein are various technologies that pertain to generation of control inputs for a cyber-physical system. A prediction concerning a phenomenon can be generated, utilizing a classifier, based on sensor data acquired by a sensor. The prediction can include a probability distribution over a set of possible values of the phenomenon, where the phenomenon pertains to the cyber-physical system or an environment in which the cyber-physical system operates. Control inputs for the cyber-physical system that satisfy constraints that maintain safe operation of the cyber-physical system in the environment can be synthesized. The constraints can be based on the prediction that includes the probability distribution over the set of possible values of the phenomenon. Further, the cyber-physical system can be caused to operate in the environment based on the control inputs According to various embodiments, a probabilistic framework can be provided. The probabilistic framework can enable constraints to be defined for synthesis of control inputs of a cyber-physical system. Further, the constraints for the cyber-physical system can be formed based on the probabilistic framework. The constraints can be based on predictions that include probability distributions over sets of possible values of phenomena. Moreover, the phenomena can pertain to the cyber-physical system and/or an environment in which the cyber-physical system operates.

Moreover, pursuant to various embodiments, predictions generated by classifiers can be joined for generating controls for a cyber-physical system. A first prediction generated utilizing a first classifier and a second prediction generated utilizing a second classifier can be combined. The first prediction can include a first probability distribution and the second prediction can include a second probability distribution. Moreover, constraints that maintain safe operation of the cyber-physical system in an environment can be based on a combination of the first prediction and the second prediction. Control inputs for the cyber-physical system that satisfy the constraints can be synthesized. Further, the cyber-physical system can be caused to operate in the environment based on the control inputs.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
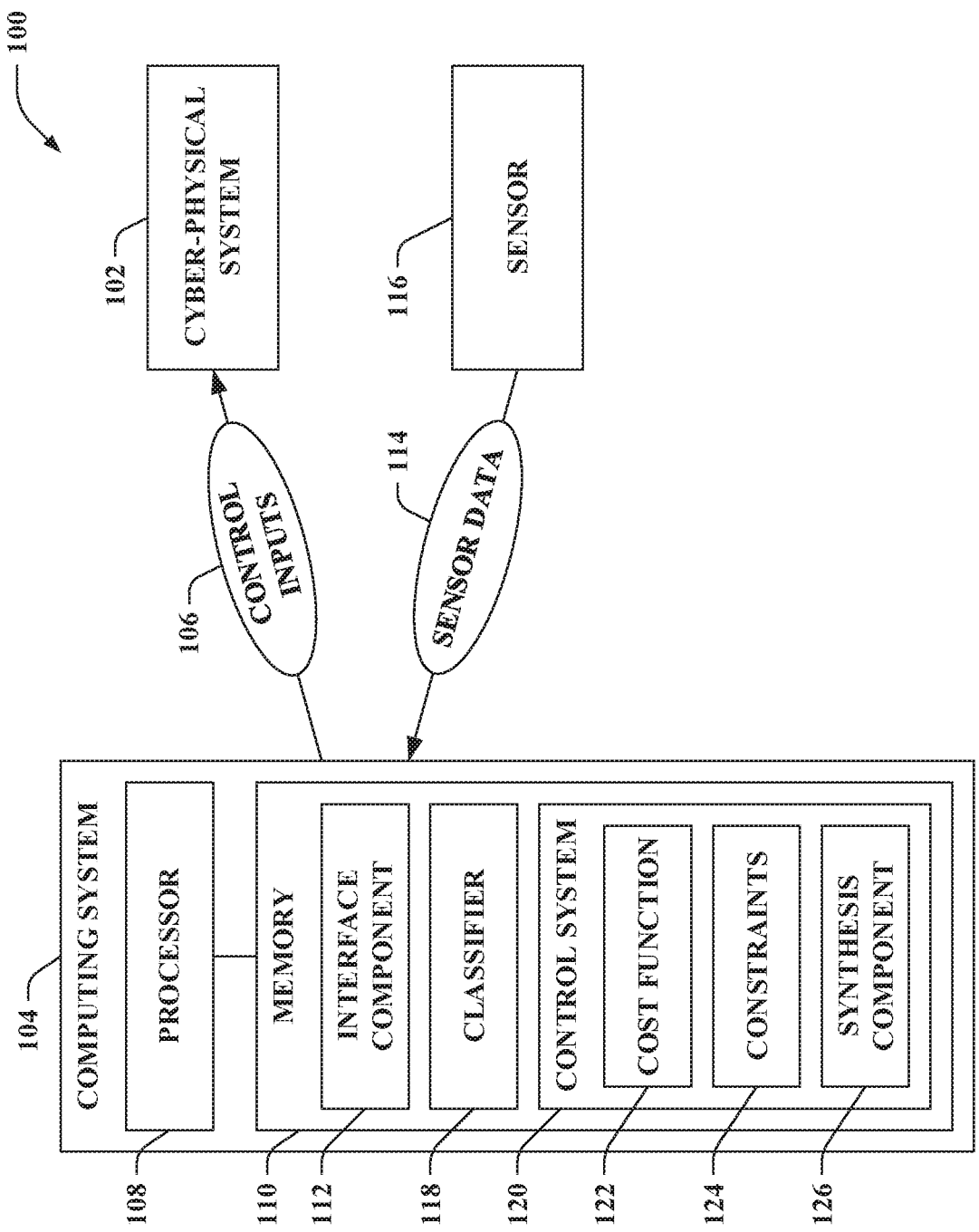
FIG. 1 illustrates a functional block diagram of an exemplary system that controls a cyber-physical system.

Various technologies pertaining to synthesizing control inputs for a cyber-physical system under uncertainty are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Classifiers (e.g., predictors, regressors, machine learning systems) built based on acquired sensor data can be used to synthesize control inputs for cyber-physical systems. However, the classifiers may be subject to error, which can detrimentally impact safety of the cyber-physical systems when operating based on the synthesized control inputs. Synthesizing the control inputs for the cyber-physical systems employing conventional approaches is oftentimes challenging due to various factors that include uncertainty arising from environments in which the cyber-physical systems are operated. For example, a safe control strategy for a quadcopter can incorporate predictive information about wind gusts and associated uncertainty in such wind gust predictions; however, traditional approaches for synthesizing control inputs oftentimes do not consider uncertainty in the wind gust predictions. Similarly, in the case of autonomous driving, a probabilistic predictive model about other vehicles on the road can be incorporated in a safe control strategy in order to mitigate collisions; however, traditional techniques typically fail to consider uncertainty pertaining to the other vehicles when synthesizing control inputs. Conventional techniques for synthesizing control inputs typically lack a model of uncertainty that characterizes a range of possible outcomes, which detrimentally impacts safety resulting from control inputs for cyber-physical systems synthesized using such conventional techniques.

A framework is set forth herein that enables control inputs to be synthesized in view of limitations imposed by the classifiers. The framework can be employed to synthesize control inputs for cyber-physical systems that enhance safety of the cyber-physical systems by incorporating uncertainty concerning predictions generated by the classifiers (e.g., uncertainty as to whether the classifiers succeed or fail). The framework can reside on a cyber-physical system or a computing system separate from but in communication with the cyber-physical system. Moreover, it is contemplated that part of the framework can reside on the cyber-physical system (e.g., sensing, machine learning), and a remainder of the framework can reside on the separate computing system (e.g., trajectory generation, planning).

Referring now to the drawings, FIG. 1 illustrates a system 100 that controls a cyber-physical system 102. According to the example set forth in FIG. 1, the cyber-physical system 102 can be controlled by a computing system 104 that is separate from but in communication with the cyber-physical system 102. The cyber-physical system 102 can be an autonomous or semi-autonomous system for which the computing system 104 can generate control inputs 106. The cyber-physical system 102, for example, can be a smart grid, an autonomous automotive system, a medical monitoring system, a process control system, a robotics system, a quadcopter, or the like.

The computing system 104 can synthesize the control inputs 106 for the cyber-physical system 102, and the control inputs 106 can be transmitted from the computing system 104 to the cyber-physical system 102. Moreover, operation of the cyber-physical system 102 can be controlled based on the control inputs 106. While the cyber-physical system 102 and the computing system 104 are separate in FIG. 1, as shown in other examples set forth herein it is to be appreciated that the cyber-physical system 102 can alternatively or additionally synthesize control inputs; thus, the example of FIG. 1 can be extended to scenarios where the cyber-physical system 102 synthesizes and employs the control inputs.

The computing system 104 includes at least one processor 108 and memory 110. The processor 108 is configured to execute instructions loaded into the memory 110 (e.g., one or more systems loaded into the memory 110 are executable by the processor 108, one or more components loaded into the memory 110 are executable by the processor 108). As described in greater detail herein, the memory 110 includes instructions for synthesizing the control inputs 106 for the cyber-physical system 102.

According to various examples, the computing system 104 can be or include a computing device. Pursuant to various illustrations, the computing device can be a desktop computing device, a mobile computing device (e.g., a laptop computing device, a mobile telephone, a smartphone, a tablet computing device, a wearable computing device, a handheld computing device, a portable gaming device, a personal digital assistant), a gaming console, or the like. In accordance with other examples, the computing system 104 can be or include one or more server computing devices. For instance, the computing system 104 can be or include one or more data centers, where a data center includes a plurality of server computing devices. Additionally or alternatively, the computing system 104 can be a distributed computing system.

The memory 110 can include an interface component 112. According to the example depicted in FIG. 1, the interface component 112 can be configured to receive sensor data 114 acquired by a sensor 116. The interface component 112 can receive the sensor data 114 from the sensor 116 (e.g., the sensor 116 can transmit the sensor data 114 to the computing system 104), a differing computing system that includes or is coupled with the sensor 116 (e.g., such differing computing system can transmit the sensor data 114 to the computing system 104), or the like. Substantially any type of sensor 116 is intended to fall within the scope of the hereto appended claims. While one sensor 116 is depicted in FIG. 1, it is contemplated that the system 100 can include substantially any number of sensors, which can be substantially similar to the sensor 116. Moreover, it is to be appreciated that the cyber-physical system 102 can additionally or alternatively include a sensor (e.g., the cyber-physical system 102 can transmit sensor data acquired by the sensor to the computing system 104). It is also contemplated that the computing system 104 can additionally or alternatively include a sensor.

The memory 110 further includes a classifier 118 configured to generate a prediction concerning a phenomenon based at least in part upon the sensor data 114. The classifier 118 models uncertainty associated with the prediction concerning the phenomenon. Thus, the prediction generated by the classifier 118 includes a probability distribution over a set of possible values of the phenomenon. Although one classifier 118 is shown in FIG. 1, it is to be appreciated that the memory 110 can include substantially any number of classifiers, each of which can be substantially similar to the classifier 118. Moreover, it is contemplated that the cyber-physical system 102, the sensor 116, or a differing computing system can additionally or alternatively include a classifier; accordingly, a prediction concerning a phenomenon generated by the classifier can be transmitted to the computing system 104 and received by the interface component 112 (in addition to or instead of the sensor data 114 being sent to the computing system 104).

The cyber-physical system 102 may operate in an uncertain environment. The classifier 118 can be employed to generate a prediction concerning a phenomenon in the uncertain environment based on the sensor data 114. The phenomenon can pertain to the cyber-physical system 102 or the environment in which the cyber-physical system 102 operates (e.g., substantially anything else in the environment). For instance, the phenomenon can be an obstacle, condition, or the like in the environment in which the cyber-physical system 102 is operating; thus, the classifier 118 can be used to detect such obstacle, condition, etc.

According to an illustration where the cyber-physical system 102 is a quadcopter, the sensor 116 can be a camera (e.g., a front mounted camera of the quadcopter). Following this illustration, the camera can capture an input image (or input images), which can be transmitted to the computing system 104. The interface component 112 can receive the input image(s), and the classifier 118 can generate a prediction concerning where obstacles are located in the environment (e.g., relative to a position of the quadcopter) based on the input image(s). For instance, the classifier 118 can detect a location of a wall, a ceiling, a differing quadcopter, a person, and/or other obstacle(s) in the environment. Pursuant to another example where the cyber-physical system 102 is a quadcopter, the phenomenon for which the prediction is generated by the classifier 118 can be a value of a battery state of the quadcopter (e.g., due to uncertain environment factors that can affect battery level such as radio communication, etc.).

Uncertainty in an environment of the cyber-physical system 102 can be represented using probability theory. According to an example, the classifier 118 can utilize Bayesian methods to infer distributions over latent phenomenon of interest. Bayesian networks (or graphical models) can allow expression of complex interactions between sets of latent variables, and the Bayesian inference procedure can be employed to compute probability distributions over variables of interest. By employing Bayesian methods (as opposed to some other optimization based machine learning methods), the classifier 118 can output a distribution over the variables of interest. The distribution provided by the classifier 118 can characterize the uncertainty present in the environment and can enable the control inputs 106 to be synthesized such that safety is maintained.

While many of the examples set forth herein describe the classifier 118 being a Bayesian classifier or a Bayesian linear regressor, it is to be appreciated that substantially any type of machine learning approach that outputs a distribution over the variables of interest can be employed. Thus, the examples set forth herein can be extended to scenarios where substantially any type of machine learning method that provides confidence and/or uncertainty concerning its prediction can be utilized. Examples of other types of machine learning methods that can be used include expert systems, self-aware machine learning algorithms, and machine learning algorithms that work under the Know What It Knows (KWIK) paradigm.

The memory 110 also includes a control system 120 configured to generate the control inputs 106 for the cyber-physical system 102. The control inputs 106 can be transmitted by the interface component 112 to the cyber-physical system 102 in the example shown in FIG. 1 (e.g., to cause the cyber-physical system 102 to operate in the environment based on the control inputs 106). The cyber-physical system 102 can have the sensor 116 (as well as other sensor(s)) and the classifier 118 (as well as other classifier(s)) that can provide guidance, but the guidance comes with uncertainty.

Accordingly, the control system 120 can factor such uncertainty and make control decisions that maintain safety associated with the cyber-physical system 102. The control system 120 can use the prediction from the classifier 118 (as well as predictions from other classifier(s)) in order to assess the cyber-physical system 102 and the environment in which the cyber-physical system 102 operates to generate the control inputs 106, while mitigating detrimental impact to safety resulting from the uncertainty in the prediction(s).

The control system 120 includes a synthesis component 126 configured to synthesize the control inputs 106 that optimize a cost function 122 and satisfy constraints 124. The synthesis component 126 can synthesize the control inputs 126 for the cyber-physical system 102 that satisfy the constraints 124 to maintain safe operation of the cyber-physical system 102 in the environment. Moreover, the constraints 124 can be based on the prediction that includes the probability distribution over the set of possible values of the phenomenon.

The cost function 122 can specify an operation to be performed by the cyber-physical system 102. For instance, the cost function 122 for an autonomous automotive system can provide for the autonomous automotive system desirably driving from a first geographic location (e.g., a current location) to a second geographic location (e.g., a destination location). Moreover, safe operation of the cyber-physical system 102 can be maintained by the constraints 124 being satisfied by the synthesis component 126 when generating the control inputs 106.

The constraints 124 to be satisfied by the synthesis component 126 when synthesizing the control inputs 106 can be learned through machine learning techniques based on the sensor data 114 obtained by the sensor 116. Thus, the constraints 124 can be based on the prediction, including the uncertainty model, generated by the classifier 118 (as well as other prediction(s) generated by other classifier(s)). The constraints 124 can be defined using a framework that allows embedding predictive models and associated uncertainties. The constraints 124 can be probabilistic predicates that take random variables as parameters. The random variables can allow incorporation of Bayesian graphical models in the predicates, thereby resulting in a logic specification that can enable reasoning about safety under uncertainty. By using Bayesian graphical models (or Bayesian methods in general), the predictions (e.g., generated by the classifier 118) provide full distributions associated with the quantity of interest as opposed to a point estimate. For example, various other machine learning techniques may provide a value for wind speed; in contrast, under the Bayesian paradigm, the classifier 118 can provide a probability distribution over a set of possible wind speeds, and one or more of the constraints 124 can be based on such probability distribution over the set of possible wind speeds.

Moreover, the constraints 124 (e.g., probabilistic predicates) are adaptive: as more data is analyzed, the inferred distribution over the latent variables of interest can change, which can lead to change in the constraints 124 themselves. Accordingly, the constraints 124 can be updated based on changes over time to the probability distribution over the set of possible values of the phenomenon generated by the classifier 118. The control inputs 106 for the cyber-physical system 102 that satisfy the constraints 124 as updated over time can further be synthesized (e.g., by the synthesis component 126).

Conventional approaches for synthesizing safe control inputs for cyber-physical systems commonly either operate under deterministic environments or model uncertainty as part of the dynamics of the system. For example, Signal Temporal Logic (STL) provides a framework for expressing real-valued, dense-time temporal properties for safety, but assumes that a signal provided from a trajectory of the system is deterministically defined by the system dynamics. Moreover, other approaches that model uncertainty as a variable added to the dynamics typically lack connections to various sources of uncertainty present in the environment. For instance, with some prior approaches, it may not be clear how uncertainty arising due to sensing and classification can be incorporated while reasoning about safe control inputs.

In contrast, the control system 120 can use Probabilistic Signal Temporal Logic (PrSTL), which can enable embedding predictive models and associated uncertainties in the constraints 124. PrSTL is a logic for expressing probabilistic properties that can embed Bayesian graphical models. PrSTL can be an expressive language to define stochastic properties, which enables probabilistic guarantees to be enforced as part of control synthesis performed by the synthesis component 126. Since various predictions and their associated uncertainty can be embedded in the constraints 124, the control system 120 can reason about the control inputs 106 which maintain safety associated with the cyber-physical system 102. The logic of PrSTL can further be adaptive and can change as additional data is encountered; accordingly, beliefs about latent random variables that define the constraints 124 can be updated.

Figure 2:
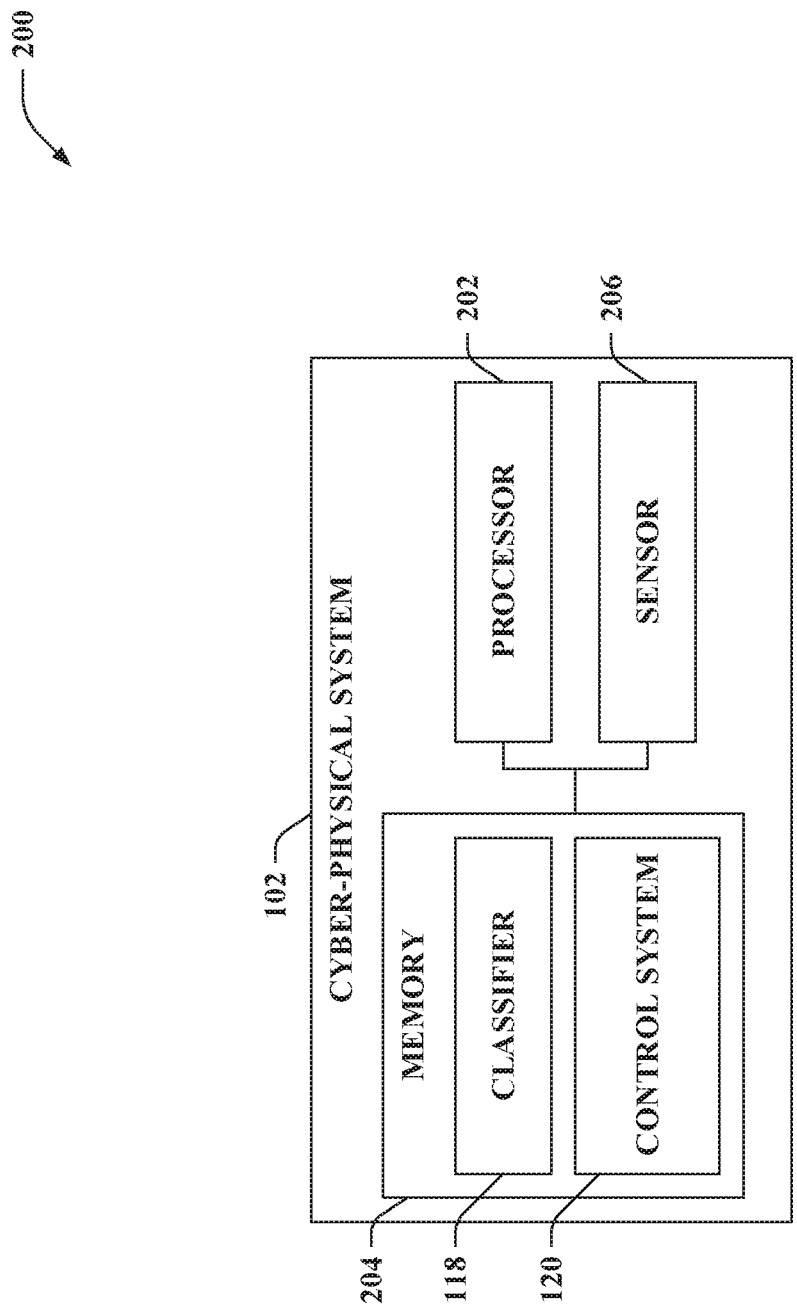
FIG. 2 illustrates a functional block diagram of an exemplary system that includes the cyber-physical system, which generates control inputs.

Turning now to FIG. 2, illustrated is another system 200 that includes the cyber-physical system 102. In the example shown in FIG. 2, the cyber-physical system 102 can include at least one processor 202, memory 204, and a sensor 206. The processor 202 is configured to execute the instructions loaded into the memory 204.

As depicted in the example of FIG. 2, the memory 204 of the cyber-physical system 102 includes the classifier 118 and the control system 120. The classifier 118 can generate a prediction concerning a phenomenon based at least in part upon sensor data acquired by the sensor 206. Although not shown, it is to be appreciated that the system 200 can include more than one sensor (e.g., the cyber-physical system 102 can include more than one sensor, the system 200 can include one or more sensors that are separate from but in communication with the cyber-physical system 102). Additionally, as described above with respect to FIG. 1, the memory 204 can include any number of classifiers in addition to the classifier 118. Moreover, the control system 120 of the cyber-physical system 102 can synthesize control inputs based at least in part on the prediction generated by the classifier 118. Accordingly, operation of the cyber-physical system 102 can be based on the control inputs synthesized by the control system 120.

According to an illustration, the cyber-physical system 102 can be an autonomous automotive system. Following this illustration, the classifier 118 (or classifiers) of the autonomous automotive system can generate a prediction (or predictions) based on sensor data acquired by the sensor 116 (as well as any number of additional sensors) concerning where pedestrians, other vehicles, curbs, or the like are located in the environment (e.g., relative to a location of the autonomous automotive system). The prediction(s) can include uncertainty model(s). Moreover, the control system 120 (e.g., the synthesis component 126) of the autonomous automotive system can synthesize the control inputs for the autonomous automotive system based on the prediction(s), including the uncertainty model(s), as described herein. Thus, the autonomous automotive system can be controlled utilizing the control inputs generated by the control system 120.

Figure 3:
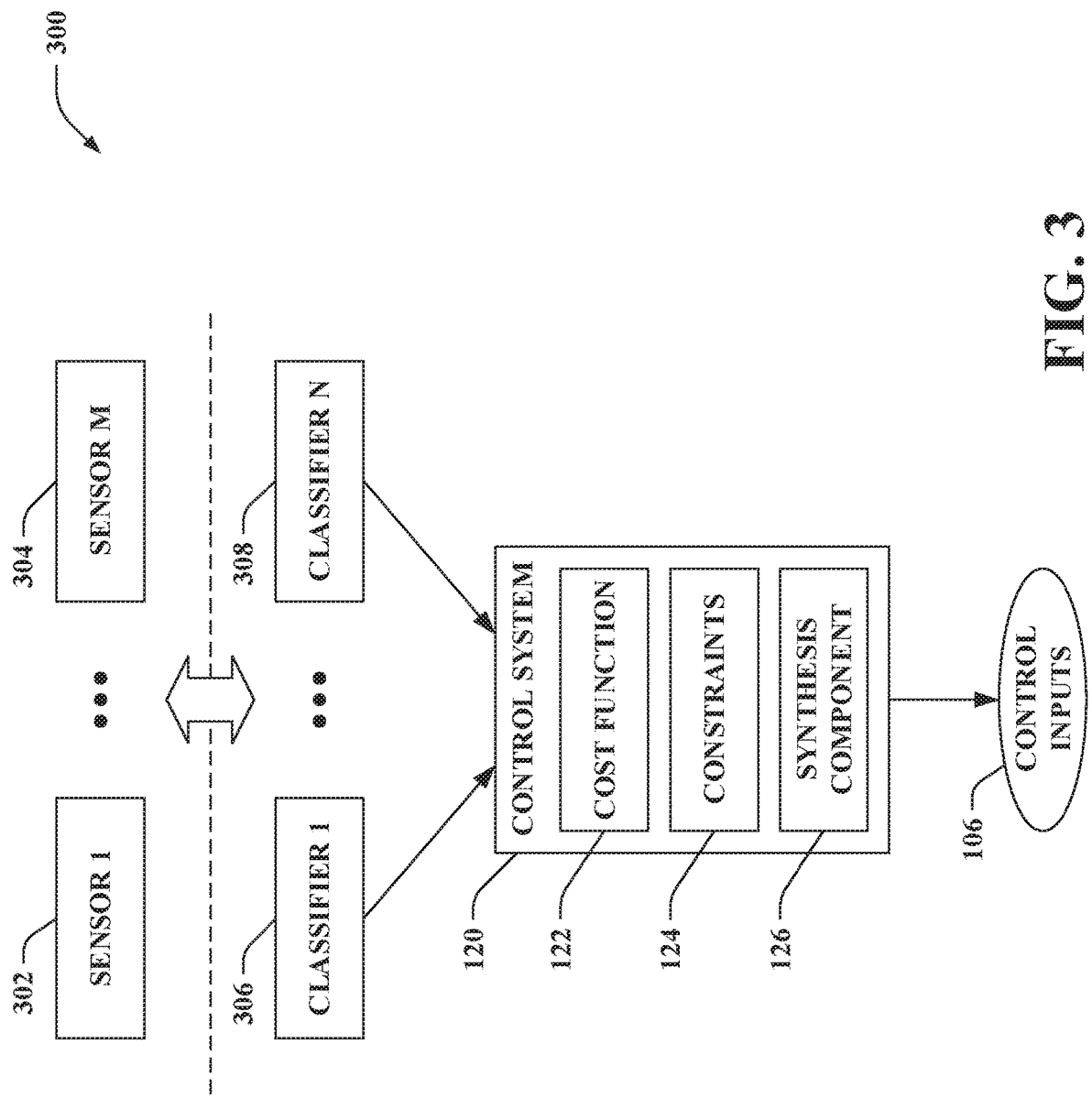
FIG. 3 illustrates a functional block diagram of an exemplary system that combines sensor data from a plurality of sensors to generate the control inputs for a cyber-physical system.

With reference to FIG. 3, illustrated is a system 300 that combines sensor data from a plurality of sensors to generate the control inputs 106 for a cyber-physical system (e.g., the cyber-physical system 102). The plurality of sensors includes a sensor 1 302, . . . , and a sensor M 304, where M can be substantially any integer equal to or greater than two (collectively referred to herein as sensors 302-304) (e.g., the sensors 302-304 can include the sensor 116 or the sensor 206). Moreover, the system 300 can include a classifier 1 306, . . . , and a classifier N 308, where N can be substantially any integer equal to or greater than two (collectively referred to herein as classifiers 306-308) (e.g., the classifiers 306-308 can include the classifier 118).

The classifiers 306-308 output predictions that include uncertainty models (e.g., probability distributions) for phenomena of interest. According to an example, the classifiers 306-308 can include Bayesian classifiers. Pursuant to another example, the classifiers 306-308 can additionally or alternatively include Bayesian linear regressors. It is also contemplated that the classifiers 306-308 can additionally or alternatively include other types of classifiers that are self-aware (e.g., other types of classifiers that output predictions including reliability based indicators across a range of possible outcomes).

The classifiers 306-308 can be inferred from observed training data. Formally, given a set of training data points $X_L = \{x_1, \ldots, x_n\}$, with observations $t_L = \{t_1, \ldots t_n\}$, where $t_i \in \{+1, -1\}$, a hyperplane w that separates points belonging to the two classes according to $\text{sgn}(w^T x)$ can be identified. For instance, under the Bayesian paradigm, the following distribution can be determined:

$$p(w | X_L, t_L) = p(w) \cdot p(t_L | X_L, w) \qquad (1)$$
$$= p(w) \prod_i p(t_i | w, x_i)$$
$$= p(w) \prod_i \mathbb{I}[[\text{sgn } w^T x_i) = t_i]$$

The first line in the above equation (1) stems from the Bayes rule, and the second line exploits the fact that, given the classifier w, labels for each of the points in the data set are independent. The expression $\mathbb{I}[\cdot]$ in the third line is an indicator function that evaluates to 1 when the condition inside the brackets holds. Thus, equation (1) starts from a prior p(w) over the classifiers and, by incorporating the training data points, infers a posterior distribution over the set of classifiers that respect the observed labels and the data points. While the above equation expresses statistical dependencies among various variables (i.e., the model), some Bayesian inference techniques can allow numerical computation of the posterior distribution $p(w|X_L, t_L)$ of interest. For example, in the case of a Bayesian classifier, Expectation Propagation can be used to infer $p(w|X_L, t_L)$ as a Gaussian distribution $N(w; \overline{w}, \Sigma)$. Linear application of this classifier to a data point as $w^T x$ can result in a Gaussian distribution of the prediction with the mean $w^T x$ and the variance $x^T \Sigma x$. For the case of Bayesian linear regression, a similar procedure can be followed, albeit with continuous target variables $t \in \mathbb{R}$ The system 300 further includes the control system 120 that generates the control inputs 106 for the cyber-physical system based on a combination of outputs from the classifiers 306-308. The synthesis component 126 of the control system 120 can synthesize the control inputs 106 that optimize the cost function 122 and satisfy the constraints 124, where the constraints 124 are based on the outputs from the classifiers 306-308. The constraints 124 can include Boolean operators and/or temporal operators that specify how the outputs from the classifiers 306-308 are combined such that safety of the cyber-physical system can be maintained as a result of the synthesized control inputs 106.

Various scenarios concerning the use of the sensors 302-304 and the classifiers 306-308 to generate predictions are intended to fall within the scope of the hereto appended claims. Below are some exemplary scenarios regarding such usage of the sensors 302-304 and the classifiers 306-308. It is contemplated that more than one of the following scenarios can be utilized in combination. Again, as noted above, the constraints 124 can specify how the predictions, including the corresponding uncertainty models, generated by the classifiers 306-308 are combined such that safety of the cyber-physical system can be maintained as a result of the control inputs 106 synthesized by the synthesis component 126.

In an exemplary scenario, sensor data acquired by one of the sensors 302-304 can be used by one of the classifiers 306-308 to generate a prediction concerning a phenomenon. Following this example, sensor data acquired by a first sensor (e.g., the sensor 1 302) can be used by a first classifier (e.g., the classifier 1 306) to generate a prediction concerning a first phenomenon. Further following this example, sensor data acquired by a second sensor (e.g., the sensor M 304) can be used by a second classifier (e.g., the classifier N 308) to generate a prediction concerning a second phenomenon, where the first and second phenomena differ.

According to another exemplary scenario, sensor data acquired by two or more of the sensor 302-304 can be used by two or more of the classifiers 306-308 to generate predictions concerning the same phenomenon. Pursuant to this example, sensor data acquired by a first sensor (e.g., the sensor 1 302) can be used by a first classifier (e.g., the classifier 1 306) to generate a first prediction concerning a phenomenon, and sensor data acquired by a second sensor (e.g., the sensor M 304) can be used by a second classifier (e.g., the classifier N 308) to generate a second prediction concerning the same phenomenon. As an illustration, an ultrasound sensor and a camera can both be utilized to capture sensor data concerning a location of a wall in an environment (e.g., a relative location of the wall from a current location of the cyber-physical system), with the sensor data from the ultrasound sensor being used by a first classifier and the sensor data from the camera being used by a second classifier. Accordingly, predictions from the first classifier and the second classifier can be combined to get a fused prediction concerning the location of the wall (e.g., the ultrasound sensor or the camera may be more prone to error at different points).

According to yet another exemplary scenario, sensor data acquired by one of the sensors 302-304 can be used by two or more of the classifiers 306-308. According to this scenario, the two or more classifiers 306-308 may generate predictions concerning the same phenomenon and/or differing phenomena. For instance, images captured by a camera (e.g., the sensor 1 302) can be used by a first classifier (e.g., the classifier 1 306) to generate a prediction about a pedestrian and used by a second classifier (e.g., the classifier N 308) to generate a prediction about a curb. According to another illustration, images captured by a camera (e.g., the sensor 1 302) can be used by two differing classifiers (e.g., the classifier 1 306 and the classifier N 308) to generate two predictions concerning a pedestrian. Following this illustration where two predictions for the same phenomenon are generated, the two differing classifiers can be inferred from differing training sets, the differing classifiers can be differing types of classifiers, a combination thereof, and so forth.

Figure 4:
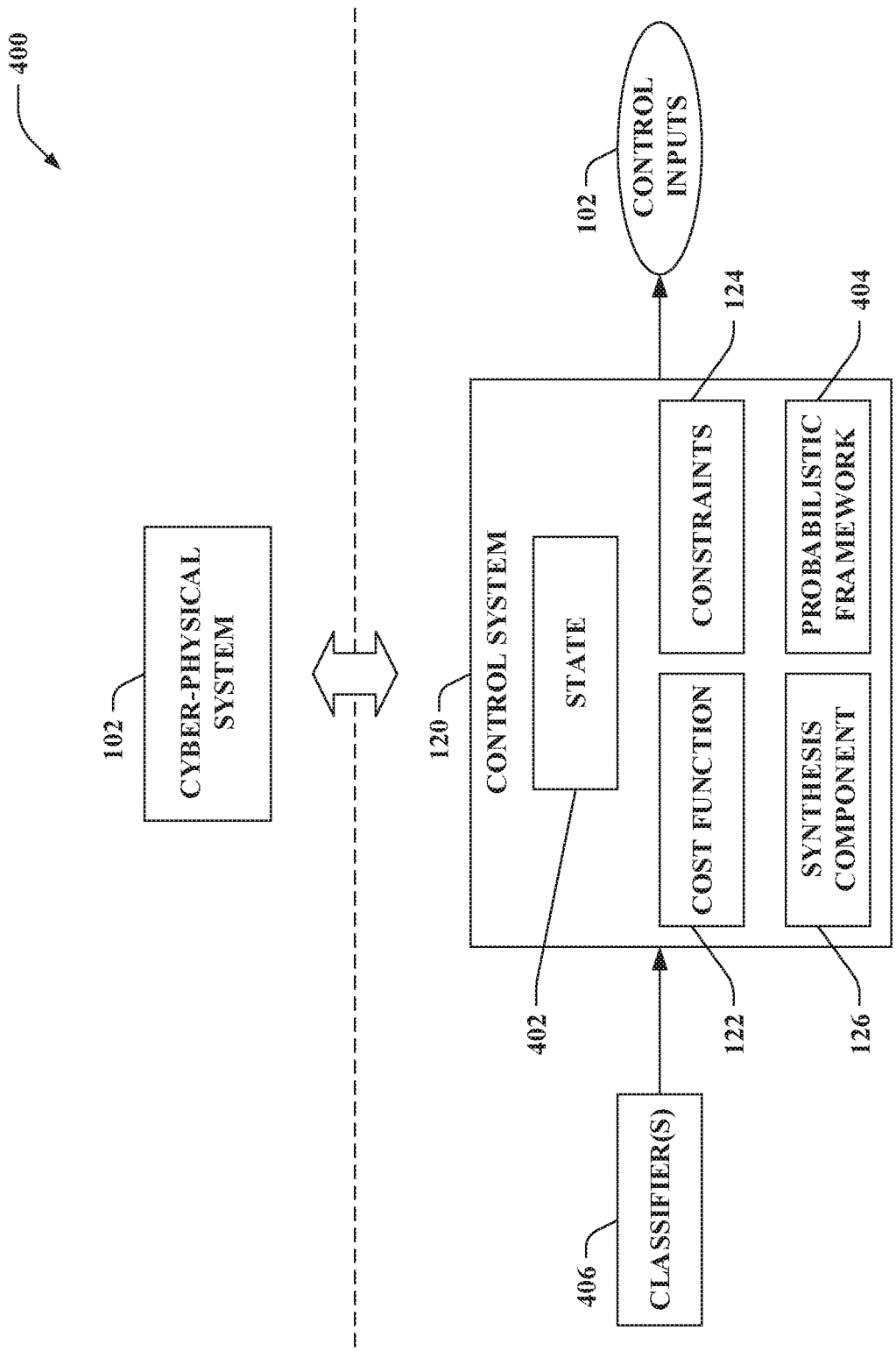
FIG. 4 illustrates a functional block diagram of another exemplary system that generates the control inputs for the cyber-physical system.

Now referring to FIG. 4, illustrated is another system 400 that generates the control inputs 106 for the cyber-physical system 102. The system 400 again includes the control system 120, which synthesizes the control inputs 106. As described herein, the cyber-physical system 102 can include the control system 120, a computing system separate from the cyber-physical system 102 (e.g., the computing system 104 of FIG. 1) can include the control system 120, a combination thereof, and so forth.

Again, the control system 120 can include the cost function 122, the constraints 124, and the synthesis component 126. Moreover, the control system 120 can include data specifying a state 402 of the cyber-physical system 102 (the data specifying the state 402 of the cyber-physical system 102 is also referred to herein as the state 402 of the cyber-physical system 102). The state 402 of the cyber-physical system 102 may not be directly observed, for example. Rather, the state 402 of the cyber-physical system 102, for instance, can be identified based on data received from the cyber-physical system 102, one or more sensors (e.g., the sensor 116, the sensors 302-304), or the like. According to an example where the cyber-physical system 102 is a quadcopter, the state 402 can include position (x,y,z) and velocity ($\dot{x},\dot{y},\dot{z}$) of the quadcopter as well as Euler angles ($\phi,\theta,\psi$) (e.g., roll, pitch, yaw) and angular velocities (p,q,r). Pursuant to another example where the cyber-physical system 102 is an autonomous automotive system, the state 402 can include coordinates of the autonomous automotive system (x,y), a direction the autonomous automotive system is heading ($\theta$), and a speed of the autonomous automotive system (v). However, it is contemplated that the state 402 is not limited to the foregoing examples. Further, as described in greater detail herein, the control inputs 106 for the cyber-physical system 102 can be synthesized by the synthesis component 126 based on the state 402.

The cyber-physical system 102 can be represented as a continuous time hybrid dynamical system as follows:

$$\dot{x}_t = f(x_t, u_t)$$

$$y_t = g(x_t, u_t) \quad (2)$$

Here, $x_t \in \chi \subseteq (\mathbb{R}^{n_c} \times \{0,1\}^{n_d})$ is a signal representing the continuous and discrete mode of the cyber-physical system 102 at time t. Moreover, $u_t \in U \subseteq (\mathbb{R}^{m_c} \times \{0,1\}^{m_d})$ represents the control inputs 106 to the cyber-physical system 102, and $y_t \in Y \subseteq (\mathbb{R}^{p_c} \times \{0,1\}^{is\ d})$ represents an output of the cyber-physical system 102 at time t. This continuous system can be discretized using time intervals dt>0, with discrete time steps k=[t/d]. Accordingly, the cyber-physical system 102 can further be represented as a discrete time hybrid dynamical system as follows:

$$x_{k+1} = f_d(x_k, u_k)$$

$$y_k = g_d(x_k, u_k) \quad (3)$$

Let $x_0 \in \chi$ denote an initial state (e.g., the state 402) of the cyber-physical system 102. An infinite run of the cyber-physical system 102 can be represented as: $\xi = (x_0, u_0), (x_1, u_1), \ldots$. Given the initial state $x_0$ 402, and a finite length control input sequence, $u^H = u_0, u_1, \ldots, u_{H-1}$ (e.g., a sequence of the control inputs 106), a finite horizon run or trajectory of the cyber-physical system 102 following the dynamics in equation (3) can be:

$$\xi^H(x_0, u^H) = (x_0, u_0), (x_1, u_1), \ldots, (x_H, u_H) \quad (4)$$

A signal that includes the state 402 and the control inputs 106 of the cyber-physical system 102 at time t can be represented as $\xi(t) = (x_t, u_t)$. Here, $\xi_x(t) = x_t$ is the state 402, and $\xi_u(t) = x_u$ represents the control inputs 106 at time t.

The output of the cyber-physical system 102 can be computed to be $y^H = y_0, y_1, \ldots, y_{H-1}$. The cost function 122 can be defined for the finite horizon trajectory, denoted by $J(\xi^H)$, and maps $\xi^H \in \Xi$, the set of trajectories to positive real valued costs in $\mathbb{R}^+$.

The control system 120 further includes a probabilistic framework 404 that can be utilized to define the constraints 124 under various uncertainties, including uncertainty that arises due to application of classifier(s) 406 (e.g., the classifier 118, the classifiers 306-308). The probabilistic framework 404 provides semantics that enable incorporation of uncertainties in predicates and specification of temporal operators and Boolean operators to be applied to the predicates. Accordingly, predictions respectively generated by the classifier(s) 406 can be combined utilizing the temporal operators and/or the Boolean operators.

The probabilistic framework 404 includes constructs that can be used (e.g., in a programming language) to form the constraints 124 for the cyber-physical system 102. The probabilistic framework 404 allows uncertainty over latent variables to be expressed via probabilistic specifications. The constraints 124 can be defined utilizing the probabilistic framework 404 by incorporating random variables in predicates, and applying temporal and Boolean operators to the predicates. The probabilistic framework 404 is also referred to herein as Probabilistic Signal Temporal Logic (PrSTL).

According to an example, the probabilistic framework 404 can be used to define differing constraints for differing cyber-physical systems. Following this example, the probabilistic framework 404 can be provided as part of a platform that can be used to form constraints for a particular cyber-physical system. The probabilistic framework 404, thus, can enable constraints to be defined for synthesis of control inputs for the particular cyber-physical system. The constraints can be formed for the particular cyber-physical system based on the probabilistic framework 404, with the constraints being based on predictions that include distributions over sets of possible values of phenomena (e.g., generated by the classifier(s) 406).

When uncertainty over the random variable is reasoned out in a Bayesian framework, inferred probability distributions can be used to derive the constraints 124 from the probabilistic framework 404. Moreover, the synthesis component 126 can synthesize the control inputs 106 for the cyber-physical system 102 given different PrSTL properties. Further, it is to be appreciated that the PrSTL formulae can evolve over time (e.g., at every step); for example, a classifier (e.g., one of the classifier(s) 406) associated with the cyber-physical system 102 can continue to learn with time, thereby changing the inferred probability distributions on the latent random variables.

In contrast to PrSTL as set forth herein, some conventional approaches synthesize control inputs using Signal Temporal Logic (STL), which provides real-valued, dense-time properties (e.g., constraints) in a receding horizon setting. However, when properties are specified in STL, the properties of the system and environment are expressed deterministically. Knowledge of exact parameters and bounds of the specification may be an unrealistic assumption for many cyber-physical system applications, where the system interacts with uncertain environments, and has partial knowledge of the world based on sensors and classifiers.

Various aspects of STL are now described for purposes of illustration. It is to be appreciated, however, that the claimed subject matter is not limited to the following discussion of STL.

STL is an expressive framework that allows reasoning about real-valued, dense-time functions. STL commonly is used for defining robustness measures and monitoring properties of real-time signals of hybrid systems. More recently, some conventional approaches synthesize control inputs that satisfy STL properties.

Formally, $(\xi, t) \models \varphi$ denotes that a signal $\xi$ satisfies the STL formula $\varphi$ at time t. An atomic predicate of an STL formula is represented by inequalities of the form $\mu(\xi(t)) > 0$, where $\mu$ is a function of the signal $\xi$ at time t. The truth value of the predicate $\mu$ can be equivalent to $\mu(\xi(t)) > 0$. An STL formula can include Boolean and temporal operators on these predicates and the syntax of STL formulae $\varphi$ can be defined recursively as follows:

$$\varphi ::= \mu | \neg | \varphi \wedge \psi \varphi G_{[a,b]} \psi | \psi U_{[a,b]} \psi \quad (5)$$

In the foregoing, $\psi$ and $\varphi$ are STL formulae, G denotes the globally operator and U is the until operator. For instance, $\xi \models G_{[a,b]} \psi$ specifies that holds at all times in the given interval, $t \in [a, b]$, of signal $\xi$. Moreover, F is the eventually operator, which can be defined as $F_{[a,b]} \psi = \neg G_{[a,b]} \neg \psi$. Satisfaction of an STL formula $\varphi$ for a signal $\xi$ at time t can be formally defined as follows:

$$(\xi, t) \models \mu \Leftrightarrow \mu(\xi(t)) > 0$$

$$(\xi, t) \models \neg \mu \Leftrightarrow \neg((\xi, t) \models \mu)$$

$$(\xi, t) \models \varphi \wedge \psi \Leftrightarrow (\xi, t) \neg \varphi \wedge (\xi, t) \neg \psi$$

$$(\xi, t) \models \varphi \vee \psi \Leftrightarrow (\xi, t) \neg \varphi \vee (\xi, t) \neg \psi$$

$$(\xi, t) \neg G_{[a,b]} \varphi \Leftrightarrow \forall t' \in [t+a, t+b], (\xi, t') \neg \varphi$$

$$(\xi, t) \neg F_{[a,b]} \varphi \Leftrightarrow \exists t' \in [t+a, t+b], (\xi, t') \neg \varphi$$

$$(\xi, t) \neg \varphi U_{[a,b]} \psi \Leftrightarrow \exists t' \in [t+a, t+b] s.t. (\xi, t') \neg \psi \wedge \forall t'' \in [t, t'], (\xi, t'') \neg \varphi \quad (6)$$

An STL formula cp is bounded-time if it includes no unbounded operators. The bound of a formula is defined as the maximum over the sum of all nested upper bounds on the STL formulae. Moreover, constraints represented using STL allow expression of temporal specifications on the runs of the system and environment and limit the allowed behavior of the closed loop system.

In contrast to STL, the probabilistic framework 404 (e.g., PrSTL) supports probabilistic temporal constraints 124 being used when generating the control inputs 106 for the cyber-physical system 102. The probabilistic temporal constraints 124 can be based on real-valued, dense-time signals. Specifically, $(\xi, t) \neg \varphi$ denotes that a signal satisfies a PrSTL formula $\varphi$ at time t. A probabilistic atomic predicate $\lambda_{\alpha_t}(\xi(t))$ of a PrSTL formula can be parameterized with a time-varying random variable $\alpha_t$ drawn from a distribution $p(\alpha_t)$ at every time step:

$$(\xi, t) \neg \lambda_{\alpha_t}^{\epsilon_t} \Leftrightarrow P(\lambda_{\alpha_t}(\xi(t)) < 0) > 1 - \epsilon_t \quad (7)$$

Here, $P(\cdot)$ represents a probability of an event, and $1 - \epsilon_t$ defines a tolerance level in satisfaction of the probabilistic properties. The parameter $\epsilon_t \in [0, 1]$ is a time-varying positive number and represents a threshold on satisfaction probability of $\lambda_{\alpha_t}(\xi(t))<0$. A signal $\xi(t)$ satisfies the PrSTL predicate $\lambda_{\alpha_t}$ with confidence $1-\epsilon_t$ if and only if:

$$\int_{\alpha_t} \|[\lambda_{\alpha_t}(\xi(t))<0]p(\alpha_t)d\alpha_t>1-\epsilon_t \quad (8)$$

In the above, $\|[\cdot]$ is an indicator function, and the equation can marginalize out the random variable $\alpha_t$ with the probability density $p(\alpha_t)$. A truth value of the PrSTL predicate $\lambda_{\alpha_t}^{\epsilon_t}$ thus can be equivalent to satisfaction of the probabilistic constraint in equation (7). It is noted that computing such integrals for general distributions may be computationally difficult; however, there are parameterized distributions (e.g., Gaussian and other members of the exponential family) for which either a closed form solution or efficient numerical procedures can exist.

Note that the probabilistic atomic predicate $\lambda_{\alpha_t}(\xi(t))$ is a stochastic function of the signal $\xi$ at time t and expresses a model of the uncertainty in an environment based on the observed signals. As the system 400 evolves and observes more data about the environment, the distribution over the random variable $\alpha_t$ changes over time, thereby leading to an adaptive PrSTL predicate. The PrSTL formula can include Boolean and temporal operations over their predicates. Moreover, PrSTL can be formulated in negation normal form, and the syntax of the probabilistic framework 404 can be recursively defined as:

$$\varphi \coloneqq \lambda_{\alpha_t}^{\epsilon_t} | \tilde{\neg} \lambda_{\alpha_t}^{\epsilon_t} | \varphi \wedge \psi | G_{[a,b]}\psi | \varphi U_{[a,b]}\psi \quad (9)$$

Here, $\varphi$ is a PrSTL formula, which can be built upon predicates $\lambda_{\alpha_t}^{\epsilon_t}$ defined in equation (7), propositional formulae cp composed of the predicates and Boolean operators such as $\wedge$(and), $\tilde{\neg}$ (negation), and temporal operators on $\varphi$ such as G (globally), F (eventually) and U (until). Note that in these operations, the PrSTL predicates can have different probabilistic parameters (e.g., $\alpha_t$ and $\epsilon_t$). In addition, satisfaction of the PrSTL formulae for each of the Boolean and temporal operators based on the predicates can be defined as follows for the probabilistic framework 404:

$(\xi,t) \vDash \lambda_{\alpha_t}^{\epsilon_t} \Leftrightarrow P(\lambda_{\alpha_t}(\xi(t))<0)>1-\epsilon_t$ $(\xi,t) \vDash \tilde{\neg} \lambda_{\alpha_t}^{\epsilon_t} \Leftrightarrow (\xi,t) \vDash -\lambda_{\alpha_t}^{\epsilon_t}$ $(\xi,t) \vDash \varphi \wedge \psi \Leftrightarrow (\xi,t) \vDash \varphi \wedge (\xi,t) \vDash \psi$ $(\xi,t) \vDash \varphi \vee \psi \Leftrightarrow (\xi,t) \vDash \varphi \vee (\xi,t) \vDash \psi$ $(\xi,t) \vDash G_{[a,b]}\varphi \Leftrightarrow \forall t' \in [t+a,t+b], (\xi,t') \vDash \varphi$ $(\xi,t) \vDash F_{[a,b]}\varphi \Leftrightarrow \exists t' \in [t+a,t+b], (\xi,t') \vDash \varphi$ $(\xi,t) \vDash \varphi U_{[a,b]}\psi \Leftrightarrow \exists t' \in [t+a,t+b] s.t. (\xi,t') \vDash \psi \wedge \forall t'' \in [t,t'], (\xi,t'') \vDash \varphi \quad (10)$ The foregoing describes constructs that can be used in a programming language, with the left hand side showing programming language semantics and the right hand side depicting corresponding mathematical representations of the constructs. For instance, the first line in equation (10) can evaluate whether a classifier outputs a value of 1 at all times, the second line in equation (10) can evaluate whether a classifier outputs a value of 0 at all times, the third line in equation (10) can evaluate a Boolean AND operator being performed based on values outputted by two classifiers, and the fourth line in equation (10) can evaluate a Boolean OR operator being performed based on values outputted by two classifiers. A globally operator is shown in line 5, an eventually operator is shown in line 6, and an until operator is shown in line 7. It is noted that the negation, $\tilde{\neg}$, defined above, does not follow the traditional logical complement properties. Rather, a formula and its negation can both be satisfied or violated based on the definition of negation utilized herein, for example. Moreover, satisfaction of a complement of a PrSTL formula can be equivalent to negating the formula's function $-\lambda_{\alpha_t}^{\epsilon_t}$.

Further, the PrSTL framework 404 can reduce to STL when the distribution $p(\alpha_t)$ is a Dirac distribution. A Dirac or a point distribution over $\alpha_t$ can cause $\lambda_{\alpha_t}(\xi(t))<0$ to be deterministic and equivalent to an STL predicate μ as described above.

Synthesis of the control inputs 106 for the cyber-physical system 102 performed by the synthesis component 126 is now described. The synthesis component 126 can synthesize the control inputs 106 based on a Model Predictive Control (MPC) approach with the constraints 124 defined utilizing the probabilistic framework 404 (e.g., PrSTL specifications), for example. As part of MPC, the cost function 122, $J(\xi^H)$ can be iteratively optimized.

More particularly, given a hybrid dynamical system as in equation (3) (e.g., the representation of the cyber-physical system 102 in equation (3)), an initial state $x_0$ 402 of the cyber-physical system 102, a PrSTL formula $\varphi$ (e.g., the constraints 12), a horizon H, and a cost function $J(\xi^H)$ 122 defined for a finite horizon trajectory $\xi^H$, the synthesis component 126 can evaluate the following:

$$\underset{u^H}{\operatorname{argmin}} \quad J(\xi^H(x_0, u^H)) \quad (11)$$

$$\text{subject to} \quad \xi^H(x_0, u^H) \vDash \varphi$$

Thus, the synthesis component 126 can identify a control strategy $u^H$ (e.g., the control inputs 106) that optimizes the given cost function 122, and satisfies the PrSTL formula (e.g., the constraints 124). Finding a control strategy for this optimization given deterministic PrSTL formulae, where $\alpha_t$ is drawn from a Dirac distribution, can be the same as solving a set of mixed integer linear constraints. Moreover, it is shown below how the optimization can be solved for the general case of PrSTL by translating the formula to a set of mixed integer constraints. Further, for Gaussian distributions, the optimization can reduce to mixed integer semi-definite programs, for example.

A PrSTL formula can generate a set of integer constraints. Given a PrSTL formula, two integer variables can be introduced for every time step t, namely, $p_t^\varphi$ and $q_t^\varphi \in \{0,1\}$, which correspond to the truth value of the PrSTL formula and its negation, respectively. These variables enforce satisfaction of the PrSTL formula $\varphi$ as follows:

$p_t^\varphi = 1 \Rightarrow (\xi,t) \vDash \varphi$ $q_t^\varphi = 1 \Rightarrow (\xi,t) \vDash \tilde{\neg} \varphi \quad (12)$ The formula $\varphi$ holds true if $p_t^\varphi=1$, and its negation $\tilde{\neg} \varphi$ holds true if $q_t^\varphi=1$. Due to the definition of negation for probabilistic formulae utilized herein, there exist signals for which $p_t^\varphi$ and $q_t^\varphi$ can both be set to 1, where both $\varphi$ and $\tilde{\neg} \varphi$ are satisfied by the signal. Using the two integer variables, constraints used for logical and temporal operations of PrSTL on $p_t^\varphi$ and $q_t^\varphi$ for all times can be defined. These integer variables can enforce the truth value of the formula $\varphi$, and can be referred to as truth value enforcers. Below, $p_t^\varphi$ and $q_t^\varphi$ are shown for logical and temporal properties supported by the probabilistic framework 404:

Negation $(\varphi = \tilde{\neg} \psi): p_t^\varphi \le q_t^\psi$ and $q_t^\varphi \le p_t^\psi$ Conjunction $(\psi = \wedge_{i=1}^N \psi_i)$: and $p_t^\varphi \le p_t^{\psi_i}$ and $q_t^\varphi \le \Sigma_{i=1}^N q_t^{\psi_i}$ Disjunction $(\varphi = \vee_{i=1}^{N} \psi_i): \varphi = \tilde{\neg} \wedge_{i=1}^{N} \tilde{\neg} \psi_i$ Globally $(\varphi = G_{[a,b]} \psi): p_t^{\varphi} \leq p_{t'}^{\psi} \forall t' \in [t+a, \min(t+b, H-1)]$ $q_t^{\varphi} \leq \Sigma_{t'=t+a}^{t+b} q_{t'}^{\psi}$ (Only for $t < H-b$).

Eventually $(\psi = F_{[a,b]} \psi): \varphi = \tilde{\neg} G_{[a,b]} \tilde{\neg} \psi$ Unbounded Until $(\varphi = \psi_1 \tilde{U}_{[0,\infty)} \psi_2): \vee_{t=0}^{H-1} ((G_{[0,t]} \psi_1)$
$\wedge (G_{[0,t]} \psi_2)) \vee$ $G_{[0,H-1]} \psi_1$ Bounded Until $(\varphi = \psi_1 U_{[a,b]} \psi_2): \varphi = G_{[0,a]} \psi_1 \wedge F_{[a,b]} \psi_2$
$\wedge$ $G_{[a,a]}(\psi_1 \tilde{U}_{[0,\infty)} \psi_2)$ Again, the foregoing shows how $p_t^{\varphi}$ and $q_t^{\varphi}$ are defined for logical properties, such as negation, conjunction, and disjunction, and temporal properties, such as globally, eventually, and until. U is used to refer to unbounded until, and U is used to refer to bounded until.

Note that while synthesizing controllers for PrSTL formulae in an MPC scheme, satisfaction of the formula outside of the horizon range H may sometimes be evaluated. For instance, a property $G_{[a,b]} \varphi$ may be evaluated beyond H for some $t' \in [t+a, t+b]$. In such cases, for example, it can be assumed that a formula holds true for time steps outside of the horizon of the globally operator, and similarly, it can be assumed a formula does not hold true for the negation of the globally operator.

Based on the recursive definition of PrSTL, and the above encoding, the truth value enforcers of a PrSTL formula can be defined using a set of integer inequalities involving a composition of the truth value enforcers of the inner predicates.

A PrSTL predicate $\lambda_{\alpha_t}^{\epsilon_t}$ for a general function can be defined as $\lambda_{\alpha_t}(\xi(t))$ for the signal $\xi$ at time t. In general, the function can allow a random variable $\alpha_t \sim p(\alpha_t)$ drawn from a distribution at every time step. However, controller synthesis that would satisfy the PrSTL predicates can be computationally difficult due to the fact that evaluation of the predicates can include computing an integration depicted in equation (8). Consequently, to solve the control problem in equation (11), the synthesis component 126 can enforce a structure on the predicates of $\varphi$. An example is set forth below, where a linear-Gaussian structure of the predicates can be used.

Formally, if $\varphi = \lambda_{\alpha_t}^{\epsilon_t}$ is a single predicate, the optimization in equation (11) can reduce to:

$$\operatorname*{argmin}_{u^H} \quad J(\xi^H(x_0, u^H)) \quad (11)$$
$$\text{subject to} \quad (\xi, t) \vDash \lambda_{\alpha_t}^{\epsilon_t} \quad \forall t \in \{0, \ldots, H-1\}$$

This optimization can translate to a chance constrained problem at every time step of the horizon, based on the definition of PrSTL predicates in equation (7):

$$\operatorname*{argmin}_{u^H} \quad J(\xi^H(x_0, u^H)) \quad (14)$$
$$\text{subject to} \quad P(\lambda_{\alpha_t}(\xi(t)) < 0) > 1 - \epsilon_t \quad \forall t \in \{0, \ldots, H-1\}$$

However, with such chance constrained optimization, it is possible that the above optimization in equation (14) is not convex. The convexity can depend on the structure of the function $\lambda_{\alpha_t}$ and the distribution $p(\alpha_t)$. The problem takes a convex form when the function $\lambda_{\alpha_t}$ takes a linear-Gaussian form (e.g., the random variable $\alpha_t$ comes from a Gaussian distribution and the function itself is linear in $\alpha_t$) as set forth below:

$$\lambda_{\alpha_t}(\xi((t)) = \alpha_t^T \xi_x(t) = \alpha_t^T x_t, \alpha_t \sim \mathcal{N}(\mu_t, \Sigma_t) \quad (15)$$

For this structure of $\lambda_{\alpha_t}$, where $\lambda_{\alpha_t}$ is a weighted sum of states with Gaussian weights $\alpha_t$, the chance constrained optimization in equation (14) is convex. Accordingly, the optimization problem can be transformed to a second-order cone program (SOCP). As an illustration, a normally distributed random variable $v \sim \mathcal{N}(0,1)$ can be considered, with its cumulative distribution function (CDF) $\Phi$ as follows:

$$\Phi(z) = \int_{-\infty}^{z} \frac{1}{\sqrt{2\pi}} e^{\frac{-t^2}{2}} dt \quad (16)$$

Following this illustration, the chance constrained optimization can reduce to SOCP via the following derivation:

$$P(\lambda_{\alpha_t}(\xi(t)) < 0) > 1 - \epsilon_t \quad (17)$$

$$\Leftrightarrow P(\alpha_t^T x_t < 0) > 1 - \epsilon_t$$

$$\Leftrightarrow P\left(v < \frac{-\mu_t^T x_t}{\sqrt{x_t^T \Sigma_t x_t}}\right) > 1 - \epsilon_t$$

$$\Leftrightarrow \int_{-\infty}^{\frac{-\mu_t^T x_t}{\sqrt{x_t^T \Sigma_t x_t}}} \frac{1}{\sqrt{2\pi}} e^{\frac{-t^2}{2}} dt > 1 - \epsilon_t$$

$$\Leftrightarrow \Phi\left(\frac{-\mu_t^T x_t}{\sqrt{x_t^T \Sigma_t x_t}}\right) < \epsilon_t$$

$$\Leftrightarrow \mu_t^T x_t - \Phi^{-1}(\epsilon_t) \left\|\Sigma_t^{\frac{1}{2}} x_t\right\|_2 < 0$$

In this formulation, $\mu_t^T x_t$ is a linear term, where $\mu_t$ is the mean of the random variable $\alpha_t$ at every time step, and $$\left\|\Sigma_t^{\frac{1}{2}} x_t\right\|_2$$

is the $l_2$-norm representing a quadratic term, where $\Sigma_t$ is the variance of $\alpha_t$. This quadratic term can be scaled by $\Phi^{-1}(\epsilon_t)$, the inverse of the Normal CDF function, which can be negative for small values of $\epsilon_t \leq 0.5$. Thus, a chance constraint can be reformulated as a SOCP. Accordingly, with a convex cost function $J(\xi^H)$, the following convex optimization can be solved for predicates of PrSTL:

$$\operatorname*{minimize}_{u^H} \quad J(\xi^H(x_0, u^H)) \quad (14)$$
$$\text{subject to} \quad \mu_t^T x_t - \Phi^{-1}(\epsilon_t) \left\|\Sigma_t^{\frac{1}{2}} x_t\right\|_2 < 0 \quad \forall t \in \{0, \ldots, H-1\}$$

Assuming a linear-Gaussian form of the function, the SOCP above can be generated and can be translated to a semi-definite program (SDP) by introducing auxiliary variables. This semi-definite program that solves the problem in equation (13) with a single constraint $\varphi = \lambda_{\alpha_t}^{\epsilon_t}$ can be used as a building block; such building block can be used multiple times to handle complex PrSTL formulae. For example, a PrSTL formula can be decomposed to its predicates by recursively introducing integer variables that correspond to the truth value enforcers of the formula at every step as set forth herein.

It is noted that the linear-Gaussian form can subsume the case of Bayesian linear classifiers, and consequently, the framework can be applied to a variety of scenarios where a classification or regression function estimates quantities of interest pertaining to safety of the cyber-physical system 102. Furthermore, the framework can be applicable to random variables whose distributions exhibit unimodal behavior and align with the large law of numbers. Moreover, for cases of non-Gaussian random variables, an approximate inference procedure that approximates the distributions as Gaussian distributions can be used.

As discussed above, at the predicate level of $\varphi$, a chance constrained problem can be created for predicates $\lambda_{\alpha_t}^{\epsilon_t}$. These predicates of the PrSTL formulae can be reformulated as a semi-definite program, where the predicates are over intersections of cone of positive definite matrices with affine spaces. Semi-definite programs are special cases of convex optimization; consequently, finding a control strategy $u^H$ as set forth above in equation (11) for PrSTL predicates is a convex optimization problem. Moreover, as described above, integer variables for temporal and Boolean operators of the PrSTL formula can be supported; construction of such integer variables can increase the complexity of finding the control strategy as set forth in equation (11), and results in a mixed integer semi-definite program (MISDP). However, integer variables need not be created for all temporal and Boolean operators. Therefore, convex PrSTL can be defined as a subset of PrSTL formulae that can be solved without constructing integer variables.

In particular, convex PrSTL can be a subset of PrSTL such that it is recursively defined over the predicates by applying Boolean conjunctions, and the globally temporal operator. Satisfaction of a convex PrSTL formulae can be defined as:

$$(\xi,t) \vDash \lambda_{\alpha_t}^{\epsilon_t} \Leftrightarrow P(\lambda_{\alpha_t}(\xi(t))<0)>1-\epsilon_t$$

$$(\xi,t) \vDash \varphi \wedge \psi \Leftrightarrow (\xi,t) \vDash \varphi \wedge (\xi,t) \vDash \psi$$

$$(\xi,t) \vDash G_{[a,b]}\varphi \Leftrightarrow \forall t' \in [t+a,t+b], (\xi,t') \vDash \varphi \quad (19)$$

Given a convex PrSTL formula $\varphi$, a hybrid dynamical system as in equation (3), and an initial state $x_0$ 402, the controller synthesis problem with convex PrSTL constraints cp can be a convex program. Based on the foregoing, a number of integer variables used for finding the control strategy $u^H$ can be reduced. For instance, integer variables can be introduced when disjunctions, eventually, or until operators appear in the PrSTL constraints. Even when a formula is not completely part of the convex PrSTL, integer variables can be introduced only for the non-convex segments.

Exemplary pseudocode for synthesizing the control inputs 106 performed by the synthesis component 126 is set forth below. It is to be appreciated that this pseudocode is provided for illustration purposes, and the claimed subject matter is not so limited.

---

Algorithm 1: Controller Synthesis with PrSTL Formulae 1.     procedure PROB.SYNTHESIS(f, $x_0$, H, $\tau$, J, $\varphi$)
2.     Let $\tau = [t_1, t_2]$ is the time interval of interest.
3.     past $\leftarrow$ Initialize($t_1$)
4.     for t = $t_1$: dt: $t_2$
5.         $f_{lin}$ = linearize(f, ($\xi$(t))
6.         $\alpha_t \leftarrow$ Update Distributions($\alpha_{t-dt}$, sense($\xi$ (t))
7.         $\varphi \leftarrow \varphi(\alpha_t, \epsilon_t)$
8.         $C_{PrSTL}$ = MISDP($\varphi$)
9.         C = $C_{PrSTL} \wedge f_{lin} \wedge [\xi$ ($t_1$ ... t − dt) = past]
10.       $u^H$ = optimize(J($\xi^H$), C)
11.       $x_{t+1}$ = f ($x_t$, $u_t$)
12.       past $\leftarrow$ [past $\xi$ (t)]
13.    end for
14.  end procedure

---

The foregoing pseudocode provides an algorithm for controlling dynamical systems (e.g., the cyber-physical system 102) in uncertain environments. In line 3, at the first time step $t_1$, an open-loop control algorithm can be run to populate past. A closed-loop algorithm can then be executed, finding an optimal strategy at every time step of the time interval $\tau=[t_1, t_2]$. In the closed-loop algorithm, dynamics at the current local state and time can be linearized in line 5, and then distributions over the random variables in the PrSTL formula can be updated based on new sensor data in line 6. Then, the PrSTL formulae can be updated based on the updated distributions. If there are other dynamic parameters that change at every time step, they can also be updated in line 7. In line 8, the mixed integer constraints in $C_{PrSTL}$ can be generated, and then C can be populated with the constraints including the PrSTL constraints, linearized dynamics, and enforcing the past trajectory. Note that integer variables need not be constructed if the formula is in the subset of convex PrSTL. Then, the finite horizon optimization algorithm can be called under the cost function J($\xi^H$) and the constraints C in line 10, which can provide a length H strategy $u^H$. The state can be advanced with the first element of $u^H$, and the history of the trajectory in past can be updated. This loop can continue to run and synthesize control inputs over time steps in interval $\tau$.

An exemplary scenario is now presented for illustration purposes. For the following exemplary scenario, input controls are synthesized for a quadcopter. It is to be appreciated that the following exemplary scenario is provided to set forth an example of various aspects described herein; however, the claimed subject matter is not limited to the following exemplary scenario.

Controlling quadcopters in dynamic uncertain environments can be a challenging task. Different sources of uncertainty appear while controlling quadcopters (e.g., uncertainty about positions of obstacles based on classification methods, distributions over wind profiles or battery profiles, etc.). Below it is shown how properties of different models of uncertainty over time can be expressed, which can be used to find a control strategy under such uncertain environments.

The quadcopter can be considered as a 12 dimensional system, where the state includes the position and velocity of the quadcopter x, y, z and $\dot{x}$, $\dot{y}$, $\dot{z}$, as well as the Euler angles $\varphi$, $\theta$, $\psi$, (i.e., roll, pitch, yaw) and the angular velocities p, q, r. Let x be:

$$x=[xyz\dot{x}\dot{y}\dot{z}\varphi\theta\psi pqr]^T \quad (20)$$

The system can have a 4 dimensional control input as set forth below:

$$u=[u_1 u_2 u_3 u_4]^T \quad (21)$$

In equation (21), $u_1$, $u_2$ and $u_3$ are the control inputs about each axis for roll, pitch and yaw, respectively. Further, $u_4$ represents the thrust input to the quadcopter in the vertical direction (z-axis). The nonlinear dynamics of the system can be represented as:

$$f_1(x, y, z) = [\dot{x} \quad \dot{y} \quad \dot{z}]^T \quad (22)$$

$$f_2(\dot{x}, \dot{y}, \dot{z}) = [0 \quad 0 \quad g]^T - \frac{R_1(\dot{x}, \dot{y}, \dot{z})[0 \quad 0 \quad 0 \quad u_4]^T}{m}$$

$$f_3(\phi, \theta, \psi) = R_2(\dot{x}, \dot{y}, \dot{z})[\dot{\phi} \quad \dot{\theta} \quad \dot{\psi}]^T$$

$$f_4(p, q, r) = I^{-1}[u_1 \quad u_2 \quad u_3]^T - R_3(p, q, r)I[p \quad q \quad r]^T$$

As shown in equation (22), $R_1$ and $R_2$ can be rotation matrices, relating body frame and inertial frame of the quadcopter, $R_3$ can be a skew-symmetric matrix, and I can be the inertial matrix of the rigid body. Also, g and m denote gravity and mass of the quadcopter. Then, the dynamics equation can be represented as follows:

$$f(x,u)=[f_1 f_2 f_3 f_4]^T$$

Figure 5:
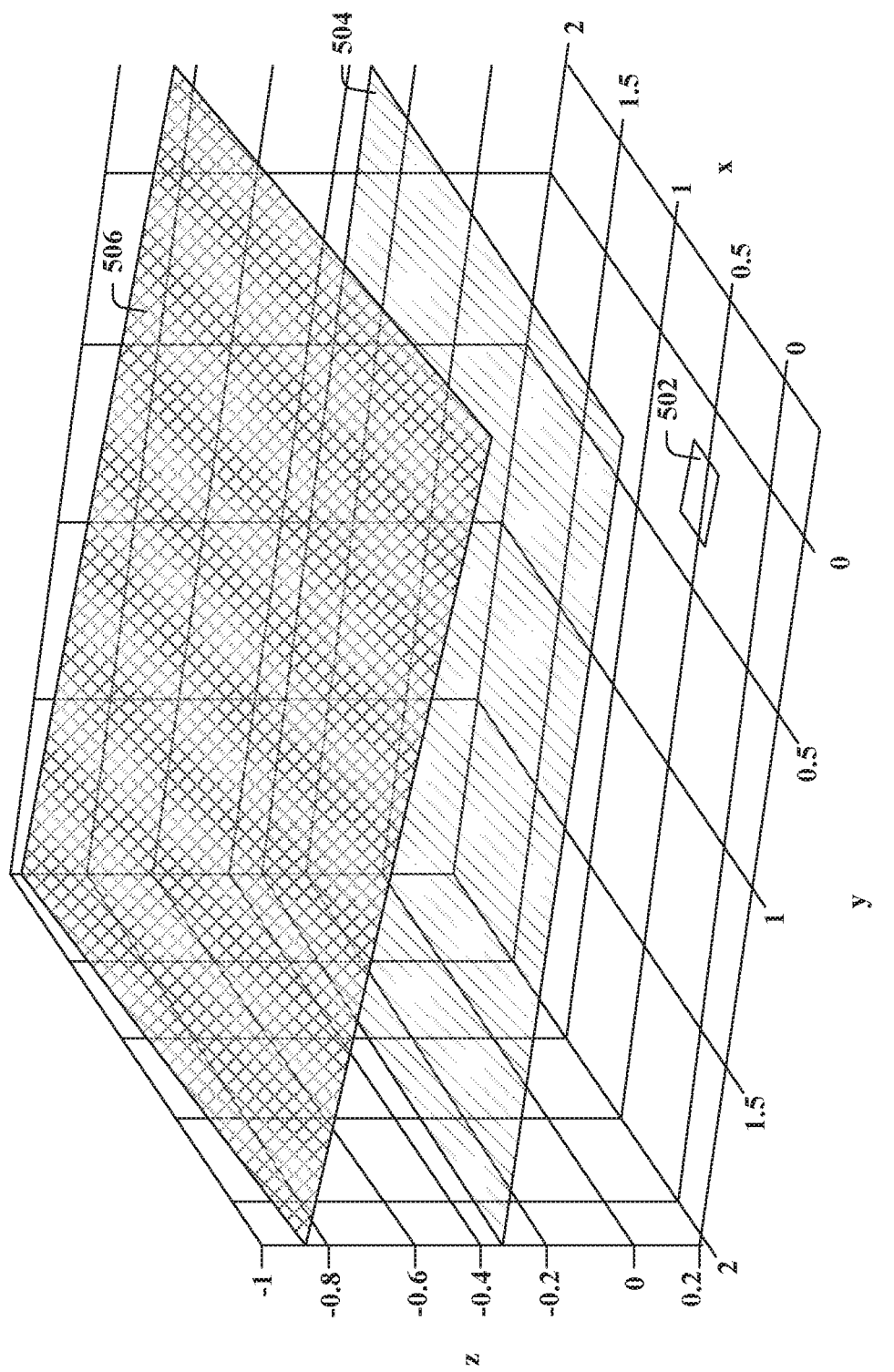
FIG. 5 illustrates an exemplary scenario where a quadcopter travels through an environment while avoiding collisions with a ceiling.

According to an example, it can be desired for a quadcopter to reach a point in space while avoiding obstacles. This is shown in FIG. 5, where the quadcopter is represented by a square 502 at its starting position, the origin (0; 0; 0). The objective for the quadcopter is to reach the coordinates (1; 1; 0) smoothly. In the following, let z=0 represent the ground level; thus, the objective of the quadcopter in this exemplary scenario can be to take off and travel a distance, and then land on the ground again.

A convention is used herein where z<0 is above the ground level. Accordingly, the following objective can be optimized:

$$J(\xi^H) = \Sigma_{t=0}^{H-1} \|(x_t, y_t, z_t) - (1,1,0)\|_2^2 + c \|\phi_t, \theta_t, \psi_t\|_2^2 \quad (24)$$

Here, the $l_2$-norm of the Euler angles can be penalized by a factor of c to provide for a smooth trajectory. According to an example used herein, c=2. In addition to initializing the state and control input at zero, the following deterministic PrSTL formulae (e.g., constraints) can be satisfied:

$\varphi_{roll} = G_{[0,\infty)}(\|u_1\| \leq 0.3)$ Bounds on Roll Input $\varphi_{pitch} = G_{[0,\infty)}(\|u_2\| \leq 0.3)$ Bounds on Pitch Input $\Phi_{thrust} = G_{[0,\infty)}(\|u_4\| \leq 0.3)$ Bounds on Thrust $\quad (25)$ In FIG. 5, a surface 504 is a ceiling that the quadcopter should not collide with as it is taking off and landing at the final position. However, the quadcopter can lack full knowledge of where the ceiling is located. Thus, a surface 506 shows a belief of where the ceiling is based on sensor data at a particular time (e.g., an initial estimate). A sensing mechanism used for the quadcopter can include a mesh grid of points around the body of the quadcopter. As the quadcopter moves in the space, a Bayesian binary classifier can be updated by providing a single label −1 (no obstacles present) or 1 (obstacle present) for each of the sensed points.

The Bayesian classifier can have the linear-Gaussian form. Applying this classifier results in a Gaussian distribution for points in the 3D-space. A classifier with confidence $1-\epsilon_t = 0.95$ can be used; the classifier can be defined as the stochastic function $\lambda_{\alpha_t}^{0.05}(\xi(t)) = \alpha_t^T[x_t, y_t, z_t]$, where $x_t$, $y_t$, and $z_t$ define the coordinates of the sensing points in the space, and $\alpha_t \mathcal{N}(\mu_t, \Sigma_t)$ is the Gaussian weight inferred over time using the sensed data. Moreover, a time-varying probabilistic constraint to be held at time steps as its value changes over time can be defined. The constraint can specify that given a classifier based on the sensing points parameterized by $\alpha_t$, the quadcopter can be enforced to stay within a safe region (defined by the classifier) with probability $1-\epsilon_t$, for $\epsilon_t = 0.05$ over the times. Thus, the probabilistic formula can be:

$\varphi_{classifier} = G_{[0.1,\infty)}(\lambda_{\alpha_t}^{0.05})$ which is equivalent to:

$$\varphi_{classifier} = G_{[0.1,\infty)}(P(\alpha_t^T[x_t, y_t, z_t] < 0) > 0.95) \quad (26)$$

The probabilistic predicate can be enforced at times in $t \in [0.1,\infty)$, which verifies the property starting from after the initial state, so the quadcopter has gathered some sensor data. Further, the surface 506 can represent a second order cone created based on $\varphi_{classifier}$. This surface 506 can be represented as follows:

$$\mu_t^T[x_t \quad y_t \quad z_t] - \Phi^{-1}(0.05) \left\| \Sigma_t^{\frac{1}{2}} [x_t \quad y_t \quad z_t] \right\|_2 < 0 \quad (27)$$

Note that the surface 506 shown in FIG. 5, at the initial time step, is not an accurate estimate of where the ceiling is, and it is based on a distribution learned from the initial values of the sensors. Thus, if the quadcopter followed this estimate without updating, it would collide with the ceiling, since the surface 506 showing the belief of the location of the ceiling is above the surface 504 representing the real position of the ceiling. However, the Bayesian inference running at the steps of the optimization can update the distribution over the classifier. Thus, the surface 506 can change over time, since the parameters of the learned random variable $\alpha_t$, which are $\mu_t$ and $\Sigma_t$, can be updated at every step. Again, as noted above, some constraints can be time-varying, and can be updated at steps of the optimization. Moreover, the dynamics can be updated at the time steps, since the dynamics can be locally linearized around a current position of the quadcopter at the steps.

Figure 6:
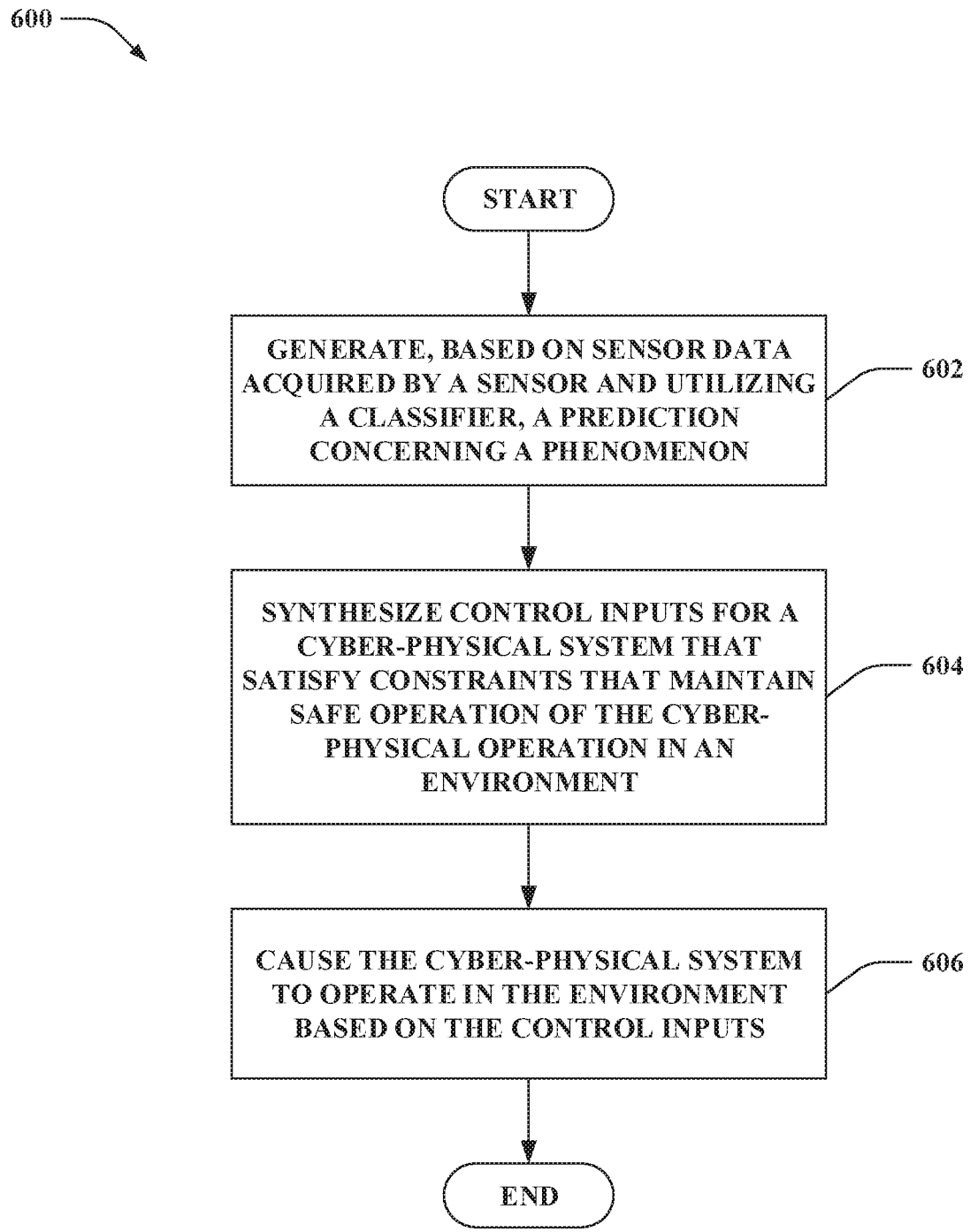
FIG. 6 is a flow diagram that illustrates an exemplary methodology of controlling a cyber-physical system.
Figure 7:
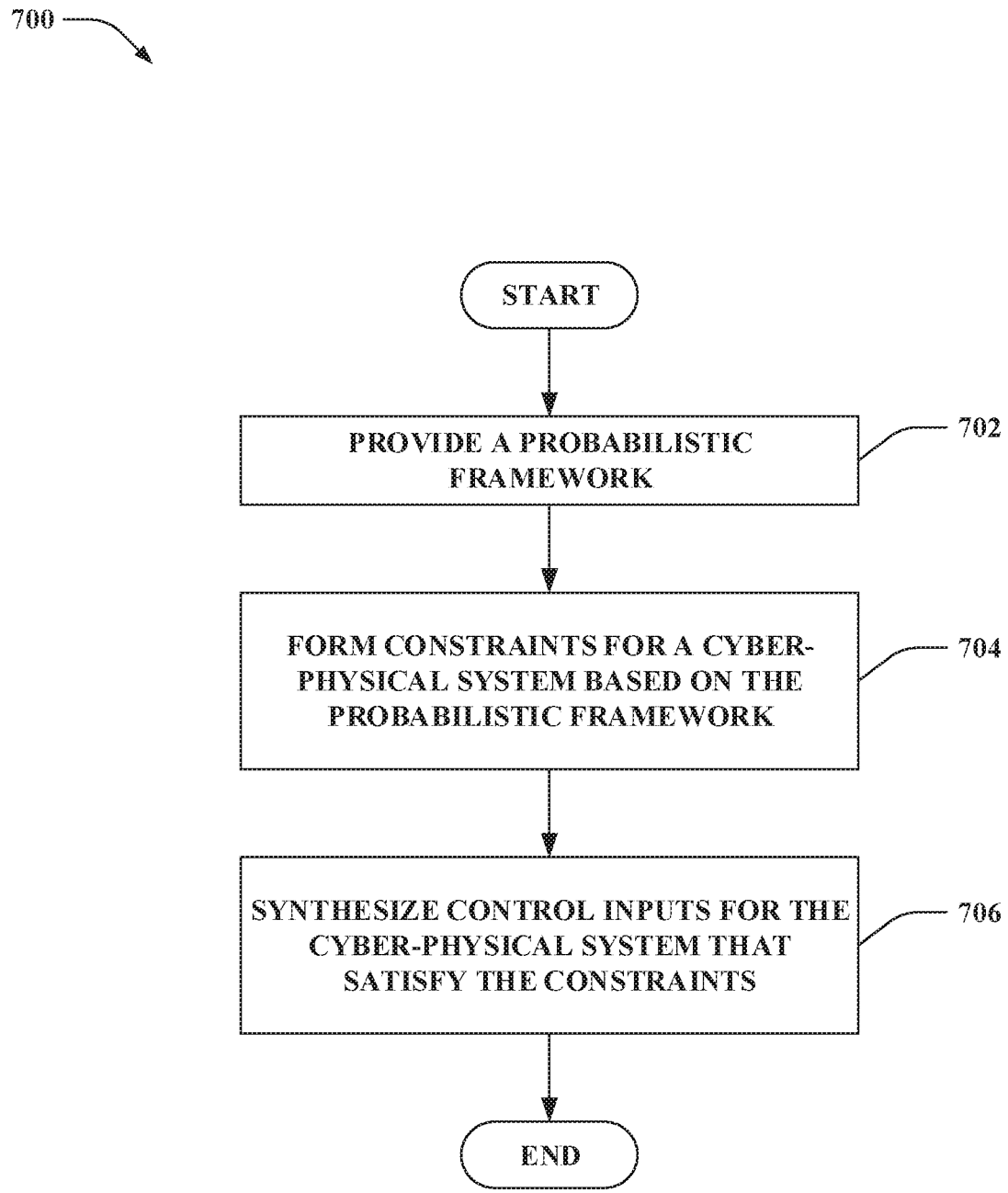
FIG. 7 is a flow diagram that illustrates another exemplary methodology of controlling a cyber-physical system.
Figure 8:
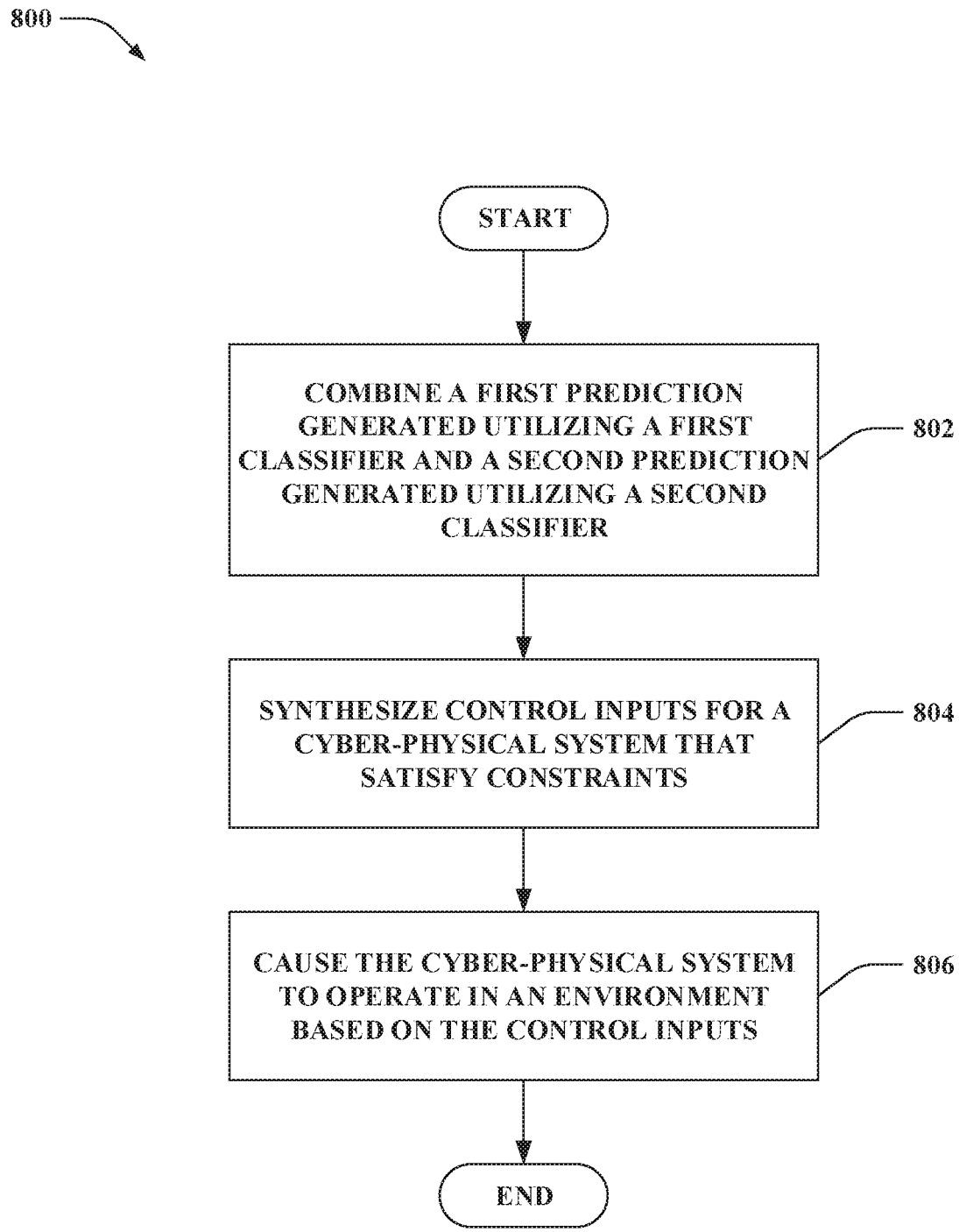
FIG. 8 is a flow diagram that illustrates yet another exemplary methodology of controlling a cyber-physical system.

FIGS. 6-8 illustrate exemplary methodologies relating to controlling a cyber-physical system. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 6 illustrates a methodology 600 of controlling a cyber-physical system. At 602, a prediction concerning a phenomenon can be generated. The prediction can be generated based on sensor data acquired by a sensor and utilizing a classifier. The prediction can include a probability distribution over a set of possible values of the phenomenon. Moreover, the phenomenon can pertain to the cyber-physical system or an environment in which the cyber-physical system operates. At 604, control inputs for the cyber-physical system that satisfy constraints that maintain safe operation of the cyber-physical system in the environment can be synthesized. At 606, the cyber-physical system can be caused to operate in the environment based on the control inputs. For example, the control inputs can be synthesized by the cyber-physical system; following this example, the cyber-physical system can implement the control inputs. By way of another example, the control inputs can be transmitted to the cyber-physical system to cause the cyber-physical system to operate based on the control inputs (e.g., the control inputs can be transmitted from a computing system separate from but in communication with the cyber-physical system).

Turning to FIG. 7, illustrated is another methodology 700 of controlling a cyber-physical system. At 702, a probabilistic framework (PrSTL) can be provided. The probabilistic framework can enable constraints to be defined for synthesis of control inputs of a cyber-physical system. At 704, constraints for the cyber-physical system can be formed based on the probabilistic framework. The constraints can be based on predictions that include probability distributions over sets of possible values of phenomena. Moreover, the phenomena can pertain to the cyber-physical system and/or an environment in which the cyber-physical system operates. At 706, the control inputs for the cyber-physical system that satisfy the constraints can be synthesized.

Referring now to FIG. 8, illustrated is yet another methodology 800 of controlling a cyber-physical system. At 802, a first prediction generated utilizing a first classifier and a second prediction generated utilizing a second classifier can be combined. The first prediction can include a first probability distribution and the second prediction can include a second probability distribution. Moreover, constraints that maintain safe operation of the cyber-physical system in an environment can be based on a combination of the first prediction and the second prediction. At 804, control inputs for the cyber-physical system that satisfy the constraints can be synthesized. At 806, the cyber-physical system can be caused to operate in the environment based on the control inputs.

Figure 9:
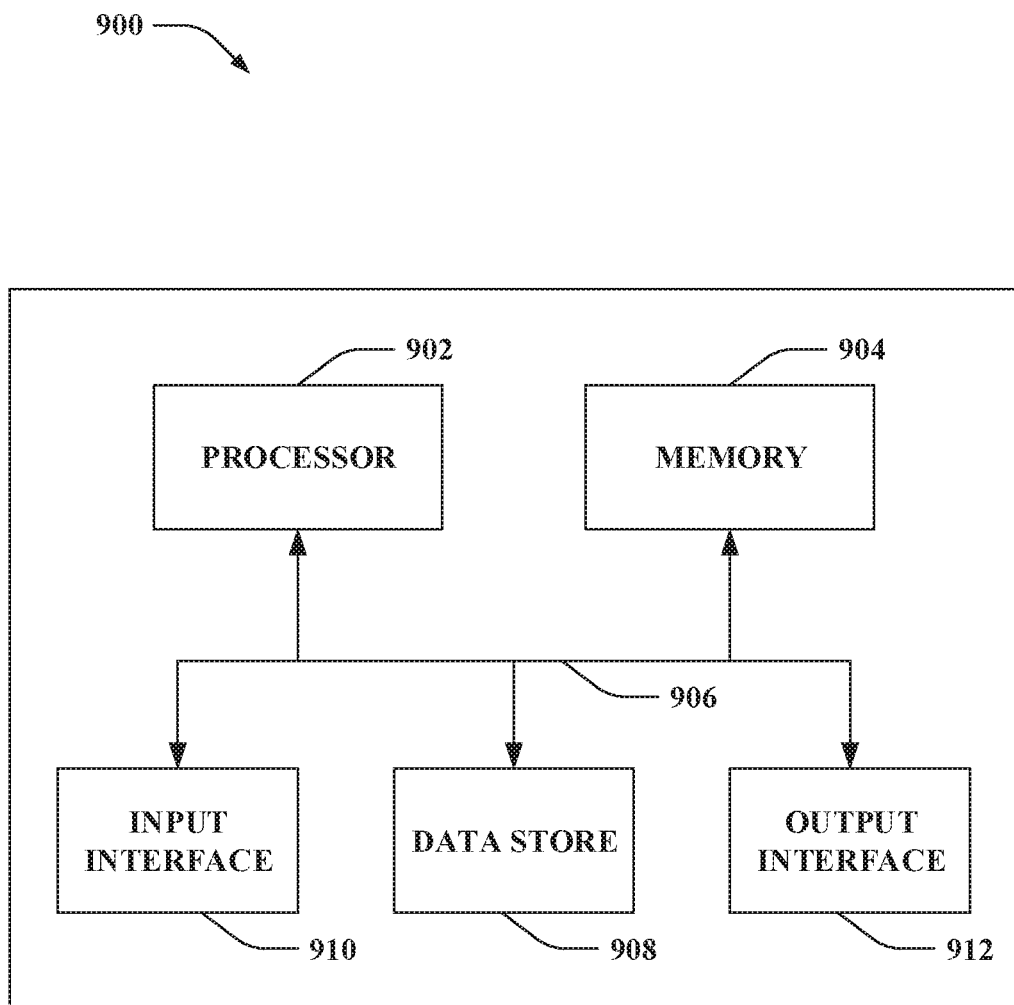
FIG. 9 illustrates an exemplary computing device.

Referring now to FIG. 9, a high-level illustration of an exemplary computing device 900 that can be used in accordance with the systems and methodologies disclosed herein is illustrated. For instance, the computing device 900 may be or include the computing system 104. According to another example, the computing system 104 can include the computing device 900. Pursuant to yet another example, the cyber-physical system 102 can be or include the computing device 900. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store predictions, cost functions, constraints, states, a probabilistic framework, sensor data, control inputs, training data for classifiers, and so forth.

The computing device 900 additionally includes a data store 908 that is accessible by the processor 902 by way of the system bus 906. The data store 908 may include executable instructions, predictions, cost functions, constraints, states, a probabilistic framework, sensor data, control inputs, training data for classifiers, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

Figure 10:
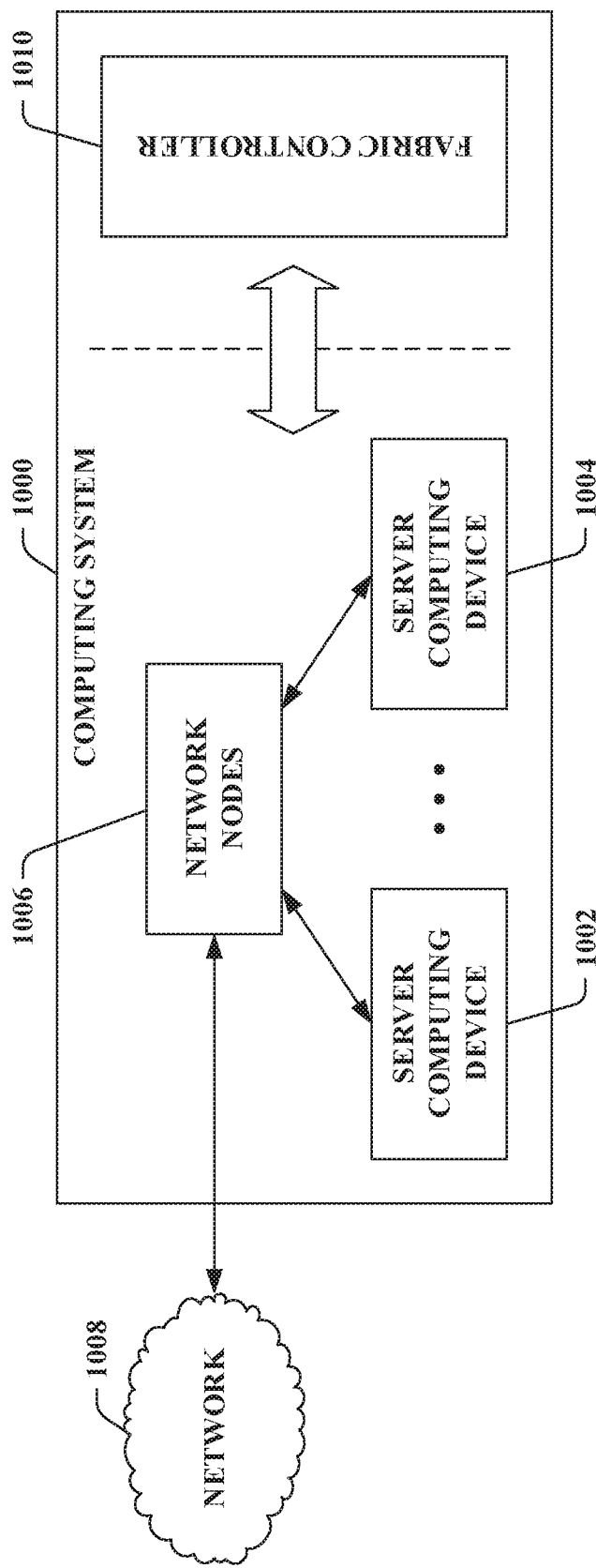
FIG. 10 illustrates an exemplary computing system.

Turning to FIG. 10, a high-level illustration of an exemplary computing system 1000 that can be used in accordance with the systems and methodologies disclosed herein is illustrated. For instance, the computing system 1000 can be or include the computing system 104. Additionally or alternatively, the computing system 104 can be or include the computing system 1000.

The computing system 1000 includes a plurality of server computing devices, namely, a server computing device 1002, . . . , and a server computing device 1004 (collectively referred to as server computing devices 1002-1004). The server computing device 1002 includes at least one processor and a memory; the at least one processor executes instructions that are stored in the memory. The instructions may be, for instance, instructions for implementing functionality described as being carried out by one or more components or systems discussed above or instructions for implementing one or more of the methods described above. Similar to the server computing device 1002, at least a subset of the server computing devices 1002-1004 other than the server computing device 1002 each respectively include at least one processor and a memory. Moreover, at least a subset of the server computing devices 1002-1004 include respective data stores.

Processor(s) of one or more of the server computing devices 1002-1004 can be or include the processor 108. Further, a memory (or memories) of one or more of the server computing devices 1002-1004 can be or include the memory 110.

The computing system 1000 further includes various network nodes 1006 that transport data between the server computing devices 1002-1004. Moreover, the network nodes 1002 transport data from the server computing devices 1002-1004 to external nodes (e.g., external to the computing system 1000) by way of a network 1008. The network nodes 1002 also transport data to the server computing devices 1002-1004 from the external nodes by way of the network 1008. The network 1008, for example, can be the Internet, a cellular network, or the like. The network nodes 1006 include switches, routers, load balancers, and so forth.

A fabric controller 1010 of the computing system 1000 manages hardware resources of the server computing devices 1002-1004 (e.g., processors, memories, data stores, etc. of the server computing devices 1002-1004). The fabric controller 1010 further manages the network nodes 1006. Moreover, the fabric controller 1010 manages creation, provisioning, de-provisioning, and supervising of virtual machines instantiated upon the server computing devices 1002-1004.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of controlling a cyber-physical system, comprising:
    generating, based on sensor data acquired by a sensor and utilizing a classifier, a prediction concerning a phenomenon, the prediction comprises a probability distribution over a set of possible values of the phenomenon, and the phenomenon pertains to the cyber-physical system or an environment in which the cyber-physical system operates;
    synthesizing control inputs for the cyber-physical system based on a cost function given a state of the cyber-physical system, the control inputs satisfying probabilistic temporal constraints that maintain safe operation of the cyber-physical system in the environment, at least one of the probabilistic temporal constraints being based on the prediction that comprises the probability distribution over the set of possible values of the phenomenon, the probabilistic temporal constraints comprising probabilistic predicates upon which at least one Boolean operator and at least one temporal operator are applied, the probabilistic predicates comprise a probabilistic predicate upon which a temporal operator is applied, the probabilistic predicate being parameterized with a time-varying random variable drawn from the probability distribution over the set of possible values of the phenomenon; and
    causing the cyber-physical system to operate in the environment based on the control inputs.

2. The method of claim 1, causing the cyber-physical system to operate in the environment based on the control inputs further comprises:
    transmitting the control inputs to the cyber-physical system.

3. The method of claim 1, further comprising:
    updating the probabilistic temporal constraints based on changes over time to the probability distribution over the set of possible values of the phenomenon; and
    synthesizing the control inputs for the cyber-physical system that satisfy the probabilistic temporal constraints as updated over time.

4. The method of claim 1, wherein the cost function specifies an operation to be performed by the cyber-physical system.

5. The method of claim 1, wherein the cyber-physical system is one of a smart grid, an autonomous automotive system, a medical monitoring system, a process control system, a robotics system, or a quadcopter.

6. The method of claim 1, wherein the probabilistic temporal constraints are defined based on a probabilistic framework, and wherein the probabilistic framework provides semantics that enable incorporation of uncertainties in predicates and specification of temporal operators and Boolean operators to be applied to the predicates.

7. The method of claim 1, wherein the probabilistic temporal constraints are further based on at least one differing prediction generated utilizing at least one differing classifier, and wherein the prediction and the at least one differing prediction are combined utilizing one or more of a temporal operator or a Boolean operator.

8. The method of claim 1 being executed by the cyber-physical system.

9. The method of claim 1 being executed by a computing system separate from but in communication with the cyber-physical system.

10. The method of claim 1, wherein the classifier is one of a Bayesian classifier or a Bayesian linear regressor.

11. A computing system, comprising:
at least one processor; and
memory that comprises computer-executable instructions that, when executed by the at least one processor, cause the at least one processor to perform acts including:
providing a probabilistic framework, wherein the probabilistic framework enables probabilistic temporal constraints to be defined for synthesis of control inputs of a cyber-physical system;
forming the probabilistic temporal constraints for the cyber-physical system based on the probabilistic framework, wherein the probabilistic temporal constraints are based on predictions that comprise probability distributions over sets of possible values of phenomena, wherein the phenomena pertain to at least one of the cyber-physical system or an environment in which the cyber-physical system operates; and
synthesizing the control inputs for the cyber-physical system based on a cost function given a state of the cyber-physical system, the control inputs satisfying the probabilistic temporal constraints, the probabilistic temporal constraints comprising probabilistic predicates upon which at least one Boolean operator and at least one temporal operator are applied, the probabilistic predicates comprise a probabilistic predicate upon which a temporal operator is applied such that the probabilistic predicate is parameterized with a time-varying random variable drawn from a particular probability distribution over a set of possible values of a particular one of the phenomena.

12. The computing system of claim 11, wherein the probabilistic framework provides semantics that enable incorporation of uncertainties in predicates and specification of temporal operators and Boolean operators to be applied to the predicates.

13. The computing system of claim 11, wherein the memory further comprises computer-executable instructions that, when executed by the at least one processor, cause the at least one processor to perform acts including:
generating, based on sensor data acquired by sensors and utilizing classifiers, the predictions that comprise the probability distributions over the sets of possible values of the phenomena.

14. The computing system of claim 11, wherein the memory further comprises computer-executable instructions that, when executed by the at least one processor, cause the at least one processor to perform acts including:
causing the cyber-physical system to operate in the environment based on the control inputs.

15. The computing system of claim 11 being included in the cyber-physical system.

16. A method of controlling a cyber-physical system, comprising:
combining a first prediction generated utilizing a first classifier and a second prediction generated utilizing a second classifier, wherein the first prediction comprises a first probability distribution and the second prediction comprises a second probability distribution, and wherein probabilistic temporal constraints that maintain safe operation of the cyber-physical system in an environment are based on a combination of the first prediction and the second prediction;
synthesizing control inputs for the cyber-physical system based on a cost function given a state of the cyber-physical system, the control inputs satisfying the probabilistic temporal constraints, the probabilistic temporal constraints comprising probabilistic predicates upon which at least one Boolean operator and at least one temporal operator are applied, the probabilistic predicates comprise a probabilistic predicate upon which a temporal operator is applied, the probabilistic predicate being parameterized with a time-varying random variable drawn from one of the first probability distribution or the second probability distribution; and
causing the cyber-physical system to operate in the environment based on the control inputs.

17. The method of claim 16, further comprising:
generating, based on first sensor data acquired by a first sensor and utilizing the first classifier, the first probability distribution, wherein the first probability distribution concerns a first phenomenon, and wherein the first phenomenon pertains to the cyber-physical system or the environment in which the cyber-physical system operates; and
generating, based on second sensor data acquired by a second sensor and utilizing the second classifier, the second probability distribution, wherein the second probability distribution concerns a second phenomenon, wherein the second phenomenon pertains to the cyber-physical system or the environment in which the cyber-physical system operates, and wherein the first phenomenon differs from the second phenomenon.

18. The method of claim 16, further comprising:
generating, based on first sensor data acquired by a first sensor and utilizing the first classifier, the first probability distribution, wherein the first probability distribution concerns a particular phenomenon, and wherein the particular phenomenon pertains to the cyber-physical system or the environment in which the cyber-physical system operates; and
generating, based on second sensor data acquired by a second sensor and utilizing the second classifier, the second probability distribution, and wherein the second probability distribution concerns the particular phenomenon.

19. The method of claim 16, further comprising:
generating, based on sensor data acquired by a sensor and utilizing the first classifier, the first probability distribution; and
generating, based on the sensor data acquired by the sensor and utilizing the second classifier, the second probability distribution.

20. The method of claim 16, further comprising:
  updating the probabilistic temporal constraints based on changes over time to the first probability distribution and the second probability distribution; and
  synthesizing the control inputs for the cyber-physical system that satisfy the probabilistic temporal constraints as updated over time.

* * * * *